(12) United States Patent
Shang et al.

(10) Patent No.: US 11,551,393 B2
(45) Date of Patent: Jan. 10, 2023

(54) SYSTEMS AND METHODS FOR ANIMATION GENERATION

(71) Applicant: LoomAi, Inc., San Francisco, CA (US)

(72) Inventors: Chong Shang, Burnaby (CA); Eloi Henri Homere Du Bois, Austin, TX (US); Inaki Navarro, Pfaeffikon (CH); Will Welch, San Francisco, CA (US); Rishabh Battulwar, Redwood City, CA (US); Ian Sachs, Corte Madera, CA (US); Vivek Verma, Oakland, CA (US); Kiran Bhat, San Francisco, CA (US)

(73) Assignee: LoomAi, Inc., San Francisco, CA (US)

( * ) Notice: Subject to any disclaimer, the term of this patent is extended or adjusted under 35 U.S.C. 154(b) by 0 days.

(21) Appl. No.: 16/937,355

(22) Filed: Jul. 23, 2020

(65) Prior Publication Data

US 2021/0027511 A1 Jan. 28, 2021

Related U.S. Application Data

(60) Provisional application No. 62/944,284, filed on Dec. 5, 2019, provisional application No. 62/877,780, filed on Jul. 23, 2019.

(51) Int. Cl.
*G06T 13/20* (2011.01)
*G06T 13/40* (2011.01)
(Continued)

(52) U.S. Cl.
CPC .......... *G06T 13/205* (2013.01); *G06N 3/049* (2013.01); *G06N 3/08* (2013.01); *G06T 13/40* (2013.01); *G06T 15/503* (2013.01); *G10L 25/24* (2013.01)

(58) Field of Classification Search
CPC ..... G06T 13/205; G06T 13/40; G06T 15/503; G06N 3/049; G06N 3/08; G10L 25/24
See application file for complete search history.

(56) References Cited

U.S. PATENT DOCUMENTS

| 6,047,078 A | 4/2000 | Kang |
| 6,088,042 A | 7/2000 | Handelman et al. |

(Continued)

FOREIGN PATENT DOCUMENTS

| EP | 1453002 A2 | 9/2004 |
| EP | 1884896 A2 | 2/2008 |

(Continued)

OTHER PUBLICATIONS

Ravikumar et al.; "Reading Between the Dots: Combining 3D Markers and FACS Classification for High-Quality Blendshape Facial Animation"; Jun. 2016; Graphics Interface Conference 2016; pp. 143-151 (Year: 2016).*

(Continued)

*Primary Examiner* — David T Welch
(74) *Attorney, Agent, or Firm* — KPPB LLP

(57) ABSTRACT

Systems and methods for animating from audio in accordance with embodiments of the invention are illustrated. One embodiment includes a method for generating animation from audio. The method includes steps for receiving input audio data, generating an embedding for the input audio data, and generating several predictions for several tasks from the generated embedding. The several predictions includes at least one of blendshape weights, event detection, and/or voice activity detection. The method includes steps for generating a final prediction from the several predictions, where the final prediction includes a set of blendshape weights, and generating an output based on the generated final prediction.

20 Claims, 21 Drawing Sheets
(6 of 21 Drawing Sheet(s) Filed in Color)

(51) Int. Cl.
  *G06N 3/04* (2006.01)
  *G10L 25/24* (2013.01)
  *G06N 3/08* (2006.01)
  *G06T 15/50* (2011.01)

(56) References Cited

U.S. PATENT DOCUMENTS

| | | |
|---|---|---|
| 6,278,466 B1 | 8/2001 | Chen |
| 6,466,215 B1 | 10/2002 | Matsuda et al. |
| 6,535,215 B1 | 3/2003 | Wideman et al. |
| 6,552,729 B1 | 4/2003 | Di Bernardo et al. |
| 6,554,706 B2 | 4/2003 | Kim et al. |
| 6,556,196 B1 | 4/2003 | Blanz et al. |
| 6,700,586 B1 | 3/2004 | Demers |
| 6,714,200 B1 | 3/2004 | Talnyking |
| 7,149,330 B2 | 12/2006 | Liu et al. |
| 7,168,953 B1 | 1/2007 | Poggio et al. |
| 7,209,139 B1 | 4/2007 | Keet et al. |
| 7,372,536 B2 | 5/2008 | Shah et al. |
| 7,433,490 B2 | 10/2008 | Huang et al. |
| 7,522,165 B2 | 4/2009 | Weaver |
| 7,859,546 B2 | 12/2010 | Gornowicz et al. |
| 7,937,253 B2 | 5/2011 | Anast et al. |
| 8,004,519 B2 | 8/2011 | Gornowicz et al. |
| 8,035,643 B2 | 10/2011 | Pighin et al. |
| 8,112,254 B1 | 2/2012 | Bhat et al. |
| 8,130,225 B2 | 3/2012 | Sullivan et al. |
| 8,144,153 B1 | 3/2012 | Sullivan et al. |
| 8,174,528 B1 | 5/2012 | Conran et al. |
| 8,199,152 B2 | 6/2012 | Sullivan et al. |
| 8,237,729 B1 | 8/2012 | Hery |
| 8,390,628 B2 | 3/2013 | Harding et al. |
| 8,537,164 B1 | 9/2013 | Pighin et al. |
| 8,542,236 B2 | 9/2013 | Sullivan et al. |
| 8,553,037 B2 | 10/2013 | Smith et al. |
| 8,610,716 B1 | 12/2013 | Conran et al. |
| 8,614,714 B1 | 12/2013 | Koperwas et al. |
| 8,624,904 B1 | 1/2014 | Koperwas et al. |
| 8,649,555 B1 | 2/2014 | Bhat et al. |
| 8,659,596 B2 | 2/2014 | Corazza et al. |
| 8,666,119 B1 | 3/2014 | Bhat et al. |
| 8,681,158 B1 | 3/2014 | Sullivan et al. |
| 8,704,832 B2 | 4/2014 | Aguiar et al. |
| 8,743,125 B2 * | 6/2014 | Omote .................. G06T 13/205 345/473 |
| 8,744,121 B2 | 6/2014 | Polzin et al. |
| 8,749,556 B2 | 6/2014 | De Aguiar et al. |
| 8,786,610 B1 | 7/2014 | Pighin et al. |
| 8,797,328 B2 | 8/2014 | Corazza et al. |
| 8,854,376 B1 | 10/2014 | Bhat et al. |
| 8,860,731 B1 | 10/2014 | Cohen Bengio et al. |
| 8,913,839 B2 | 12/2014 | Ricanek, Jr. et al. |
| 8,928,672 B2 | 1/2015 | Corazza et al. |
| 8,928,674 B1 | 1/2015 | Sullican et al. |
| 8,941,665 B1 | 1/2015 | Sullivan et al. |
| 8,982,122 B2 | 3/2015 | Corazza et al. |
| 8,988,435 B1 | 3/2015 | Cohen Bengio |
| 9,001,132 B1 | 4/2015 | Bhat et al. |
| 9,123,175 B1 | 9/2015 | Goldenthal et al. |
| 9,142,055 B1 | 9/2015 | Bhat et al. |
| 9,165,393 B1 | 10/2015 | Low et al. |
| 9,183,660 B2 | 11/2015 | Koperwas et al. |
| 9,196,074 B1 | 11/2015 | Bhat et al. |
| 9,256,973 B2 | 2/2016 | Koperwas et al. |
| 9,317,740 B2 | 4/2016 | Ricanek, Jr. et al. |
| 9,317,954 B2 | 4/2016 | Li et al. |
| 9,342,912 B1 | 5/2016 | Pighin et al. |
| 9,508,178 B2 | 11/2016 | Jutan et al. |
| 9,508,179 B2 | 11/2016 | Jutan et al. |
| 9,600,742 B2 | 3/2017 | Yu et al. |
| 9,626,788 B2 | 4/2017 | Corazza et al. |
| 9,721,385 B2 | 8/2017 | Herman |
| 9,727,874 B2 * | 8/2017 | Navaratnam ....... H04M 3/5125 |
| 9,747,495 B2 | 8/2017 | Corazza et al. |
| 9,786,084 B1 | 10/2017 | Bhat et al. |
| 9,792,479 B2 | 10/2017 | Mallet et al. |
| 9,898,849 B2 | 2/2018 | Du et al. |
| 9,916,538 B2 | 3/2018 | Zadeh et al. |
| 10,062,198 B2 | 8/2018 | Bhat et al. |
| 10,169,905 B2 | 1/2019 | Bhat et al. |
| 10,198,845 B1 | 2/2019 | Bhat et al. |
| 10,210,860 B1 * | 2/2019 | Ward ..................... G10L 15/30 |
| 10,325,417 B1 * | 6/2019 | Scapel ................. A63F 13/213 |
| 10,360,905 B1 * | 7/2019 | Pereira ................... G06F 16/45 |
| 10,452,896 B1 | 10/2019 | Weise et al. |
| 10,489,957 B2 * | 11/2019 | Zelenin ................... A63F 13/63 |
| 10,559,111 B2 | 2/2020 | Sachs et al. |
| 10,659,405 B1 * | 5/2020 | Chang ................... G06F 3/0481 |
| 11,107,262 B2 * | 8/2021 | Miller, IV .............. G06F 17/16 |
| 11,113,859 B1 * | 9/2021 | Xiao ..................... G10L 15/22 |
| 2002/0012454 A1 | 1/2002 | Liu et al. |
| 2002/0050988 A1 | 5/2002 | Petrov et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0218894 A1 | 11/2004 | Harville et al. |
| 2004/0227752 A1 | 11/2004 | McCartha et al. |
| 2005/0062739 A1 | 3/2005 | Balmelli et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0126924 A1 | 6/2006 | Liu et al. |
| 2006/0134585 A1 | 6/2006 | Adamo-villani et al. |
| 2006/0171590 A1 | 8/2006 | Lu et al. |
| 2006/0228040 A1 | 10/2006 | Simon et al. |
| 2006/0245618 A1 | 11/2006 | Boregowda et al. |
| 2006/0267978 A1 | 11/2006 | Litke et al. |
| 2007/0091085 A1 | 4/2007 | Wang et al. |
| 2007/0104351 A1 | 5/2007 | Yang et al. |
| 2007/0167779 A1 | 7/2007 | Kim et al. |
| 2007/0182736 A1 | 8/2007 | Weaver |
| 2008/0002862 A1 | 1/2008 | Matsugu et al. |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |
| 2008/0170077 A1 | 7/2008 | Sullivan et al. |
| 2008/0170078 A1 | 7/2008 | Sullivan et al. |
| 2008/0180448 A1 | 7/2008 | Anguelov et al. |
| 2008/0187213 A1 | 8/2008 | Zhang et al. |
| 2008/0187246 A1 | 8/2008 | Andres Del Valle |
| 2008/0252596 A1 | 10/2008 | Bell et al. |
| 2008/0284779 A1 | 11/2008 | Gu et al. |
| 2009/0027337 A1 | 1/2009 | Hildreth |
| 2009/0067730 A1 | 3/2009 | Schneiderman |
| 2009/0195544 A1 | 8/2009 | Wrinch |
| 2009/0196466 A1 | 8/2009 | Capata et al. |
| 2009/0196475 A1 | 8/2009 | Demirli et al. |
| 2009/0202114 A1 | 8/2009 | Morin et al. |
| 2009/0202144 A1 | 8/2009 | Taub et al. |
| 2009/0231347 A1 | 9/2009 | Omote |
| 2010/0007665 A1 | 1/2010 | Smith et al. |
| 2010/0020073 A1 | 1/2010 | Corazza et al. |
| 2010/0073361 A1 | 3/2010 | Taylor et al. |
| 2010/0134490 A1 | 6/2010 | Corazza et al. |
| 2010/0141662 A1 | 6/2010 | Storey et al. |
| 2010/0149179 A1 | 6/2010 | de Aguiar et al. |
| 2010/0203968 A1 | 8/2010 | Gill et al. |
| 2010/0235045 A1 | 9/2010 | Craig et al. |
| 2010/0238182 A1 | 9/2010 | Geisner et al. |
| 2010/0253703 A1 | 10/2010 | Ostermann |
| 2010/0259547 A1 | 10/2010 | de Aguiar et al. |
| 2010/0271366 A1 | 10/2010 | Sung et al. |
| 2010/0278405 A1 | 11/2010 | Kakadiaris et al. |
| 2010/0285877 A1 | 11/2010 | Corazza |
| 2011/0234581 A1 | 9/2011 | Eikelis et al. |
| 2011/0292034 A1 | 12/2011 | Corazza et al. |
| 2011/0296331 A1 | 12/2011 | Iyer et al. |

(56) References Cited

U.S. PATENT DOCUMENTS

| | | |
|---|---|---|
| 2011/0304622 A1 | 12/2011 | Rogers et al. |
| 2011/0304629 A1 | 12/2011 | Winchester et al. |
| 2012/0019517 A1 | 1/2012 | Corazza et al. |
| 2012/0038628 A1 | 2/2012 | Corazza et al. |
| 2012/0130717 A1 | 5/2012 | Xu et al. |
| 2012/0327091 A1 | 12/2012 | Eronen et al. |
| 2013/0021348 A1 | 1/2013 | Corazza et al. |
| 2013/0100140 A1 | 4/2013 | Ye et al. |
| 2013/0127853 A1 | 5/2013 | Corazza et al. |
| 2013/0215113 A1 | 8/2013 | Corazza et al. |
| 2013/0235045 A1 | 9/2013 | Corazza et al. |
| 2013/0257877 A1 | 10/2013 | Davis et al. |
| 2013/0271451 A1 | 10/2013 | Tong et al. |
| 2013/0311412 A1 | 11/2013 | Lazar et al. |
| 2014/0035934 A1 | 2/2014 | Du et al. |
| 2014/0043329 A1 | 2/2014 | Wang et al. |
| 2014/0160116 A1 | 6/2014 | de Aguiar et al. |
| 2014/0204084 A1 | 7/2014 | Corazza et al. |
| 2014/0285496 A1 | 9/2014 | de Aguiar et al. |
| 2014/0313192 A1 | 10/2014 | Corazza et al. |
| 2014/0313207 A1 | 10/2014 | Taylor et al. |
| 2015/0145859 A1 | 5/2015 | Corazza et al. |
| 2015/0193975 A1 | 7/2015 | Corazza et al. |
| 2015/0213604 A1* | 7/2015 | Li ................... G06K 9/00315 345/473 |
| 2015/0262405 A1 | 9/2015 | Black et al. |
| 2015/0358613 A1 | 12/2015 | Sandrew et al. |
| 2015/0363634 A1 | 12/2015 | Yin et al. |
| 2016/0328384 A1 | 11/2016 | Divakaran et al. |
| 2017/0011258 A1* | 1/2017 | Pitre ..................... G16H 40/67 |
| 2017/0011745 A1* | 1/2017 | Navaratnam ........ G06Q 30/016 |
| 2017/0053663 A1 | 2/2017 | Yu et al. |
| 2017/0372505 A1 | 12/2017 | Bhat et al. |
| 2018/0174348 A1 | 6/2018 | Bhat et al. |
| 2019/0034706 A1* | 1/2019 | el Kaliouby ......... H04N 21/266 |
| 2019/0057683 A1* | 2/2019 | Sak ........................ G10L 15/22 |
| 2019/0122411 A1 | 4/2019 | Sachs et al. |
| 2019/0133510 A1* | 5/2019 | el Kaliouby ............ A61B 5/168 |
| 2019/0285881 A1* | 9/2019 | Ilic ........................ G06T 19/006 |
| 2019/0325633 A1* | 10/2019 | Miller, IV .......... G06K 9/00375 |
| 2020/0228359 A1* | 7/2020 | el Kaliouby ........ G06K 9/6271 |

FOREIGN PATENT DOCUMENTS

| | | |
|---|---|---|
| EP | 3475920 A1 | 5/2019 |
| KR | 20140033088 A | 3/2014 |
| WO | 2007132451 A2 | 11/2007 |
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |
| WO | 2017223530 A1 | 12/2017 |

OTHER PUBLICATIONS

Ju et al., "Mean Value Coordinates for Closed Triangular Meshes", Proceedings of ACM SIGGRAPH, Jul. 31, 2005, 6 pgs.

Ju et al., "Reusable Skinning Templates Using Cage-based Deformations", ACM Transactions on Graphics (TOG)—Proceedings of ACM SIGGRAPH Asia 2008, vol. 27 Issue 5, 10 pgs., Dec. 2008.

Kahler et al., "Head Shop: Generating Animated Head Models with Anatomical Structure", ACM SIGGRAPH Symposium on Computer Animation, Jul. 21, 2002, pp. 55-64.

Kalogerakis, "Machine Learning Algorithms for Geometry Processing by Example", Thesis, 2010, 178 pgs.

Kumar et al., "ObamaNet: Photo-realistic lip-sync from text" ARxIV:1801.01442. Dec. 6, 2017, 4 pgs.

Laine et al., "Production-Level Facial Performance Capture Using Deep Convolutional Neural Networks", arXiv:1609.06536 [cs.CV], Jun. 2, 2017, retrieved from https://arxiv.org/abs/1609.06536 on Jul. 20, 2017, 10 pages.

Larsson, "Morph targets and bone rigging for 3D facial animation", Bachelor's Thesis in Game Design, 15 hp Program: Speldesign och grafik, Jun. 2017, 31 pgs.

Lewis, "H.264/MPEG-4 AVC CABAC overview", Oct. 25, 2012, printed Jun. 24, 2013 from http://www.web.archive.org/web/20121025003926/www.theonlineoasis.co.uk/notes.html, 3 pgs.

Lewis et al., "Pose Space Deformation: A Unified Approach to Shape Interpolation and Skeleton-Drive Deformation", Proceedings of ACM SIGGRAPH, Jul. 1, 2000, pp. 165-172.

Liepa, "Filing Holes in Meshes", Proc. of the Eurographics/ACM SIGGRAPH Symposium on Geometry Processing, Jun. 23, 2003, 8 pgs.

Lin, M. et al., "Network in network", arXiv:1312.4400 [cs.NE], Dec. 18, 2013, pp. 1-9.

Liu et al., "3D Motion Retrieval with Motion Index Tree", Computer Vision and Image Understanding, Jun. 1, 2003, vol. 92, pp. 265-284, doi:10.1016/j.cviu.2003.06.001.

Lum et al., "Combining Classifiers for Bone Fracture Detection in X-Ray Images", Image Processing, 2005, ICIP 2005, IEEE International Conference on (vol. 1) Date of Conference: Sep. 11-14, 2005, 4 pgs.

Ma et al., "An Invitation to 3D Vision", Springer Verlag, Chapter 2, 2004, pp. 15-28.

Mamou et al., "Temporal DCT-based compression of 3D dynamic meshes", ICCOM'06 Proceedings of the 10th WSEAS international conference on Communications, Jul. 10-12, 2006, pp. 74-79.

Mamou et al., "The New MPEG-4/FAMC Standard for Animated 3D Mesh Compression", IEEE 3DTV-CON'08, May 28-30, 2008, pp. 97-100.

Marsella et al., "Virtual Character Performance From Speech", Proceedings of the 12th ACM SIGGRAPH/Eurographics Symposium on Computer Animation. ACM, Jul. 19, 2013, 11 pgs.

Mekhilef et al., "Automatic Face Recognition System", The Institution of Engineers, Malaysia, vol. 69, No. 2; Jun. 2, 2008, pp. 31-39.

Mohr et al., "Building Efficient, Accurate Character Skins from Examples", ACM Transactions on Graphics, Jul. 27, 2003, vol. 22, No. 3, pp. 562-568.

Noh et al., "Expression Cloning", Proceedings of ACM SIGGRAPH, Aug. 12-17, 2001, published Aug. 1, 2001, 12 pgs.

Okada et al., "A Video Motion Capture System for Interactive Games.", MVA2007 IAPR Conference on Machine Vision Applications, May 16-18, 2007, pp. 186-189.

Park et al., "On-line locomotion generation based on motion blending", ACM SIGGRAPH Symposium on Computer Animation, Jul. 21, 2002, pp. 105-111, 194.

Park et al., "On-line motion blending for real-time locomotion generation", Computer Animation & Virtual Worlds, Jun. 16, 2004, vol. 15, pp. 125-138, DOI:10.1002/cav.15.

Persson, "ExMS: an animated and avatar-based messaging system for expressive peer communication", GROUP '03, Nov. 9-12, 2003, pp. 31-39, published Nov. 9, 2003.

Rotenberg, "Facial Expressions & Rigging", CSE169: Computer Animation, Instructor: Steve Rotenberg, UCSD, Spring 2016, 59 pgs.

Safonova et al., "Construction and optimal search of interpolated motion graphs", ACM SIGGRAPH, Jul. 2007, vol. 26, Issue 3, Article 106, 11 pgs., published Aug. 8, 2007.

Salazar et al., "Fully automatic expression-invariant face correspondence", Machine Vision and Applications, May 1, 2014, vol. 25, No. 4, pp. 859-879.

Sand et al., "Continuous Capture of Skin Deformation", ACM Transactions on Graphics, vol. 22, No. 3, pp. 578-586, Jul. 27, 2003.

Seitz et al., "A Comparison and Evaluation of Multi-View Stereo Reconstruction Algorithms", Computer Vision and Pattern Recognition, 2006 IEEE Computer Society Conference on, vol. 1,. IEEE, Jun. 17, 2006, 8 pgs.

Seo et al., "An Automatic Modeling of Human Bodies from Sizing Parameters", In Symposium on Interactive 3D Graphics, Apr. 27, 2003, pp. 19-26.

Sloan et al., "Shape By Example", In 2001 Symposium on Interactive 3D Graphics, pp. 135-144, Mar. 1, 2001.

(56) References Cited

OTHER PUBLICATIONS

Smola et al., "A Tutorial on support Vector Regression", In Technical Report NC2-TR-1998-030, NeuroCOLT2, Oct. 1998, 73 pgs.
Sumner et al., "Deformation Transfer for Triangle Meshes", Proceedings of ACM SIGGRAPH 2004, Aug. 8, 2004, vol. 23, No. 3, pp. 399-405.
Suwajanakorn et al., "Synthesizing Obama: Learning Lip Sync from Audio", ACM Transactions on Graphics, Jul. 2017, vol. 36, No. 4, Article 95, pp. 95-1-95-13, DOI: 10.1145/3072959.3073640.
Szegedy et al., "Going Deeper with Convolutions", 2015 IEEE Conference on Computer Vision and Pattern Recognition (CVPR), Jun. 7-12, 2015, pp. 1-9.
Szeliski et al., "Matching 3D Anatomical Surfaces with Non-rigid Deformations Using Octree-Splines", International Journal of Computer Vision, May 1, 1996, vol. 18, No. 2, pp. 171-186.
Taylor et al., "Modeling Human Motion Using Binary Latent Variables", Proc. of Advances in Neural Information Processing Systems (NIPS), 2007, vol. 19, 8 pgs.
Tena et al., "Interactive region-based linear 3d face models", ACM Transactions on Graphics (TOG), vol. 30, No. 4, ACM, Aug. 7, 2011, 9 pgs.
Thies et al., "Face2Face: Real-time Face Capture and Reenactment of RGB Videos", 2016 IEEE Conference on Computer Vision and Pattern Recognition (CVPR), Jun. 27-30, 2016, pp. 2387-2395.
Trigeorgis et al., "Mnemonic descent method: A recurrent process applied for end-to-end face alignment", 2016 IEEE Conference on Computer Vision and Pattern Recognition (CVPR), Jun. 27-30, 2016, pp. 4177-4187.
Tung et al., "Topology Matching for 3D Video Compression", IEEE Conference Computer Vision and Pattern Recognition, Jun. 17-22, 2007, 8 pgs.
Vasilescu et al., "Multilinear Analysis of Image Ensembles: Tensorfaces", European Conference on Computer Vision (ECCV), pp. 447-460, first online Apr. 29, 2002.
Viola et al., "Fast multi-view face detection", Proc. of Computer Vision and Pattern Recognition, Jul. 15, 2003 8 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vlasic et al., "Face Transfer with Multilinear Models", ACM Transactions on Graphics, Jul. 31, 2005, vol. 24, No. 3, pp. 426-4333.
Vlasic et al., "Multilinear Models for Face Synthesis", SIGGRAPH Research Sketch, 2004, 1 pg.
Von Luxburg, "A Tutorial on Spectral Clustering. Statistics and Computing", arXiv:0711.0189, Nov. 1, 2007, pp. 1-32.
Wang et al., "Multi-weight Enveloping: Least Squares Approximation Techniques for Skin Animation", ACM SIGGRAPH Symposium on Computer Animation, Jul. 21, 2002, pp. 129-138.
Weise et al., "Face/off: Live Facial Puppetry", Proceedings of the 2009 ACM SIGGRAPH/Eurographics Symposium on Computer animation, Aug. 1, 2009, 10 pgs.
Weise et al., "Realtime performance-based facial animation", ACM Transactions on Graphics (TOG) 30.4, Aug. 7, 2011, Article No. 77, 9 pgs.
Wikipedia, Morph target animation, Last Modified Aug. 1, 2014, Retrieved from http://en.wikipedia.org/wiki/Morph_target_animation on Jan. 16, 2015, 3 pgs.
Wiles et al., "X2Face: A network for controlling face generation using images, audio, and pose codes", in Proceedings of the European Conference on Computer Vision (ECCV), 2018, pp. 670-686.
Xiao et al., "Control of motion in character animation", Proceedings of the Eighth International Conference on Information Visualization, IEEE Computer Society, Jul. 16, 2004, 8 pgs.
Zhou et al., "Talking Face Generation by Adversarially Disentangled Audio-Visual Representation", arXiv:1807.07860, Apr. 23, 2019, 9 pgs.
Zhou et al., "VisemeNet: Audio-Driven Animator-Centric Speech Animation", ACM Transactions on Graphics, vol. 337, No. 5, May 24, 2018, pp. 1-1-1-10, arXiv:submit/2270204.
Zordan et al., "Dynamic Response for Motion Capture Animation", ACM Transactions on Graphics—Proceedings of ACM SIGGRAPH 2005, vol. 24, Issue 3, Jul. 31, 2005, pp. 697-701.
Zulqarnain et al., "Shape-based automatic detection of a large number of 3D facial landmarks", In Proceedings of the IEEE conference on computer vision and pattern recognition 2015 (pp. 4639-4648).
Extended European Search Report for European Application No. 17816350.7, Search completed Dec. 11, 2019, dated Dec. 18, 2019, 7 pgs.
International Preliminary Report on Patentability for International Application PCT/US2017/039136, Report dated Dec. 25, 2018, dated Jan. 3, 2019, 9 pgs.
International Search Report and Written Opinion for International Application PCT/US2010/033797, completed Jun. 11, 2010, 5 pgs.
International Search Report and Written Opinion for International Application No. PCT/US2009/057155, completed Dec. 22, 2009, dated Jan. 12, 2010, 10 pgs.
International Search Report and Written Opinion for International Application No. PCT/US2009/065825, completed Jan. 21, 2010, dated Jan. 28, 2010, 9 pgs.
International Search Report and Written Opinion for International Application No. PCT/US2017/039136, Search completed Aug. 21, 2017, dated Sep. 5, 2017, 17 pgs.
International Search Report and Written Opinion for International Application PCT/US2011/045060, completed Nov. 27, 2011, 6 pgs.
U.S. Appl. No. 14/222,390, Non-Final Office Action dated May 22, 2014, 66 pgs.
Abdelaziz et al., "Speaker-independent speech-driven visual speech synthesis using domain-adapted acoustic models", arXiv:1905.06860, 9 pgs.
Alkawaz et al., "Blend Shape Interpolation and FACS for Realistic Avatar", 3D Research vol. 6, No. 6, Jan. 2015, 11 pgs., DOI: 10.1007/s.13319-015-0038-7.
Allen At Al., "The Space of Human Body Shapes: Reconstruction and Parameterization from Range Scans", ACM Transactions on Graphics, Jul. 2004, vol. 22, No. 3, pp. 587-594.
Allen et al., "Articulated Body Deformation from Range Scan Data", ACM Transactions on Graphics, Jul. 21-26, 2002, vol. 21, No. pp. 612-619.
Anguelov et al., "Recovering Articulated Object Models from 3D Range Data", In Proceedings of the 20th Conference on Uncertainty in Artificial Intelligence, Jul. 7-11, 2004, pp. 18-26.
Anguelov et al., "SCAPE: Shape Completion and Animation of People", Printed Oct. 14, 2013, from www.robotics.stanford.edu/!drago/projects/scape/scape.html, 1 pg.
Anguelov et al., "The Correlated Correspondence Algorithm for Unsupervised Registration of Nonrigid Surfaces", Advance in Neural Information Processing Systems, vol. 17, 8 pgs.
Baran, Llya S., "Using Rigging and Transfer to Animate 3D Characters", Thesis, Sep. 2010, 82 pgs.
Baran et al., "Automatic rigging and animation of 3D characters", ACM Transactions on Graphics (TOG)—Proceedings of ACM SIGGRAPH 2007, Jul. 2007, vol. 26, Issue 3, 8 pgs.
Beaudoin et al., "Adapting Wavelet Compression to Human Motion Capture Clips", Graphics Interface, May 28-30, 2007, pp. 313-318.
Blanz et al., "A morphable model for the synthesis of 3D faces", SIGGRAPH '99 Proceedings of the 26th annual conference on Computer graphics and interactive techniques, Jul. 1, 1999, pp. 187-194.
Blanz et al., "Reanimating faces in images and video", EUROGRAPHICS, Sep. 2003, vol. 22, No. 3, 10 pgs.
Booth et al., "A 3d morphable model learnt from 10,000 faces", In Proceedings of the IEEE Conference on Computer Vision and Pattern Recognition 2016, pp. 5543-5552, DOI:10.1109/CVPR.2016.598.
Bray, "Markerless Based Human Motion Capture: A Survey", Published 2001, Televirtual Ltd., Norwich, UK, 44 pgs.

(56) References Cited

OTHER PUBLICATIONS

Buenaposada et al., "Performance Driven Facial Animation Using Illumination Independent Appearance-Based Tracking", Proceedings of ICPR, Hong Kong, Aug. 2006, 4 pgs.
Cheung et al., "Shape-from Silhouette of Articulated Objects and its Use for Human Body Kinematics Estimation and Motion Capture", In Conference on Computer Vision and Pattern Recognition (CVPR), Jun. 18-20, 2003, 8 pgs.
Cootes et al., "Active appearance models", Proc. European Conference on Computer Vision, 1998, vol. 2, pp. 484-498.
Corazza, Stefano et al., U.S. Appl. No. 12/579,334, Notice of Allowance dated Feb. 7, 2014, 5 pgs.
Cudeiro et al., "Capture, Learning, and Synthesis of 3D Speaking Styles", arXiv:1905.03079, May 8, 2019, pp. 10101-10111.
Curio et al., "Semantic 3D Motion Retargeting for Facial Animation", ACM, Jul. 28, 2006, 8 pgs.
Curless et al., "A Volumetric Method of Building Complex Models from Range Images", Proceedings of SIGGRAPH, 1996, pp. 303-312.
Davis et al., "Filing Holes in Complex Surfaces Using Volumetric Diffusion", Symposium on 3D Data Processing, Visualization, and Transmission, Feb. 2002, 11 pgs.
De Aguiar et al., "Automatic Conversion of Mesh Animations into Skeletonbased Animations", EUROGRAPHICS, Apr. 24, 2008, vol. 27, No. 2, 9 pgs.
De Aguiar et al., "Marker-Less 3D Feature Tracking for Mesh-Based Human Motion Capture", Human Motion, Oct. 27, 2007, LNCS 4818, pp. 1-15.
Di Bernardo et al., "Generating Realistic Human Motions from Observations", submitted to Fifth European Conference on Computer Vision, ECCV 1998, pp. 1-12.
Edwards et al., "JALI: An Animator-Centric Viseme Model for Expressive Lip Synchronization", ACM Transactions on Graphics (TOC), 2016, vol. 35, No. 4, 11 pgs., DOI: http://dx.doi.org/10.1145/2897824.2925984.
Gao et al., "Motion normalization: the preprocess of motion data", VRST '05, Nov. 7-9, 2005, pp. 253-256.
Garland et al., "Surface Simplification Using Quadric Error Metrics", Proceedings of SIGGRAPH, Aug. 3, 1997, 8 pgs.
Goncalves et al., "Reach Out and Touch Space (Motion Learning)", Proceedings, Third IEEE International Conference Apr. 14-16, 1998, 6 pgs.
Grassia, "Believable Automatically Synthesized Motion by Knowledge-Enhanced Motion Transformation", Thesis CMU-CS-00-163, Aug. 21, 2000, 215 pgs.
Grochow et al., "Style-Based Inverse Kinematics", ACM Transactions on Graphics, Aug. 1, 2004, vol. 23, No. 3, pp. 522-531.
Hahnel et al., "An Extension of the ICP Algorithm for Modeling Nonrigid Objects with Mobile Robots", Proceedings of the International Joint Conference on Artificial Intelligence (IJCAI), Aug. 9, 2003, 6 pgs.
He et al., "Deep residual learning for image recognition", arXiv:1512.03385 [cs.CV], in 2016 IEEE Conference on Computer Vision and Pattern Recognition, Dec. 10, 2015, pp. 1-12.
Hilton et al., "From 3D Shape Capture to Animated Models", IEEE Computer Society, First International Symposium on 3D Processing, Visualization and Transmission (3DVPT2002), Jun. 19-21, 2002, 10 pgs.
Hunnun et al., "Deep Speech: Scaling up end-to-end speech recognition", arXiv:1412.5567, Dec. 19, 2014, 12 pgs.
Isidro et al., "Stochastic Refinement of the Visual Hull to Satisfy Photometric and Silhouette Consistency Constraints", Boston University Computer Science Tech. Report No. 2003-017, Jul. 31, 2003, Accepted to The Ninth International Conference on Computer Vision (ICCV 2003), 14 pgs.
Jones et al., "Fast multi-view face detection", Mitsubishi Electric Research Lab TR-20003-96, Aug. 2003, 11 pgs.

\* cited by examiner

905

910

SYSTEMS AND METHODS FOR ANIMATION GENERATION

CROSS-REFERENCE TO RELATED APPLICATIONS

The current application claims the benefit of and priority under 35 U.S.C. § 119(e) to U.S. Provisional Patent Application No. 62/877,780 entitled "Systems and Methods for Animation Generation" filed Jul. 23, 2019 and U.S. Provisional Patent Application No. 62/944,284 entitled "Animation from Audio" filed Dec. 5, 2019. The disclosures of U.S. Provisional Patent Application Nos. 62/877,780 and 62/944,284 are hereby incorporated by reference in its entirety for all purposes.

FIELD OF THE INVENTION

The present invention generally relates to generating animations and, more specifically, to training and utilizing an end-to-end system for generating animation curves from multimedia content.

BACKGROUND

The animation of computer generated 3D content is becoming increasingly popular. 3D models and avatars are being introduced in many different fields and applications, such as (but not limited to) social media, live streaming, avatar puppeteering, animated emojis, teleconferencing, video chat, and multimedia content creation. However, the animation of 3D models can be technically challenging and can require extensive manual animation processes.

SUMMARY OF THE INVENTION

Systems and methods for animating from audio in accordance with embodiments of the invention are illustrated. One embodiment includes a method for generating animation from audio. The method includes steps for receiving input audio data, generating an embedding for the input audio data, and generating several predictions for several tasks from the generated embedding. The several predictions includes at least one of blendshape weights, event detection, and voice activity detection. The method includes steps for generating a final prediction from the several predictions, where the final prediction includes a set of blendshape weights, and generating an output based on the generated final prediction.

In a further embodiment, the input audio data includes mel-frequency cepstral coefficient (MFCC) features.

In still another embodiment, generating the embedding includes utilizing at least one of a recurrent neural network and a convolutional neural network to generate the embedding based on the MFCC features.

In a still further embodiment, generating the several predictions includes utilizing a multi-branch decoder, wherein the multi-branch decoder includes several Long Short Term Memory networks (LSTMs) that generate predictions for the several tasks based on the generated embedding.

In yet another embodiment, generating the several predictions includes determining a level of voice activity in the input audio data.

In a yet further embodiment, generating the several predictions includes determining whether an audio event has occurred, wherein the audio event includes at least one of laughing, crying, screaming, and/or shouting.

In another additional embodiment, generating the final prediction comprises determining whether a laughter event has occurred, and generating blendshape weights to cause an avatar to perform a laughing motion.

In a further additional embodiment, generating the final prediction comprises determining whether a level of voice activity exceeds a threshold, and when the level of voice activity does not exceed a threshold, generating blendshape weights that close the mouth.

In another embodiment again, generating the output includes rendering an avatar model based on the blendshape weights of the final prediction.

In a further embodiment again, the final prediction further includes animation curves for animating an avatar model.

Systems and methods for generating training data and animation curves in accordance with embodiments of the invention are illustrated. One embodiment includes a method for generating training data. The method includes steps for identifying a set of one or more base samples and identifying a set of animation parameters. The set of animation parameters includes at least one of landmarks, an emotion embedding, and a set of facial attributes (e.g., gender, age, face shape, face width, eye shape, etc.). The method includes steps for generating a set of animation curves based on the identified set of animation parameters, and rendering a set of rendered samples based on the generated animation curves.

In a further embodiment, the method further includes steps for training the set of models, wherein training the set of models comprises training the set of models to identify landmarks from video, and training the set of models to generate emotion embeddings from video.

In still another embodiment, training the set of models to identify landmarks from video and training the set of models to generate emotion embeddings from video are performed on a single model of the set of models.

In a still further embodiment, training the set of models to identify landmarks from video includes computing at least one of a root mean squared error (RMSE) landmark loss and a consensus landmark loss.

In yet another embodiment, training the set of models to generate emotion embeddings includes computing an emotion triplet loss.

In a yet further embodiment, training the set of models further comprises training the set of models to determine a set of facial attributes, and training the set of models to generate landmarks from audio.

In another additional embodiment, training the set of models to generate landmarks from audio includes training at least one generator model of the set of models using a discriminator loss.

In a further additional embodiment, the method further includes steps for identifying a set of edge parameters that define a set of video characteristics, wherein rendering the set of rendered samples is further based on the set of video characteristics.

In another embodiment again, the method further includes steps for storing the set of rendered samples and the set of animation curves as rendered training data, and training a model using the set of rendered samples and the set of animation curves.

In a further embodiment again, each base sample includes audio content and video content.

Systems and methods for generating animation curves in accordance with embodiments of the invention are illustrated. One embodiment includes a method for generating animation curves. The method includes steps for receiving multimedia content and passing the multimedia content through an end-to-end network to generate animation curves. The end-to-end network is trained based on animation curves derived from rendered video and animation curves used to generate the rendered video. The method includes steps for storing the generated animation curves.

In still yet another embodiment, the method further includes steps for transmitting the generated animation curves to a device, wherein the device renders an avatar based on the transmitted animation curves.

In a still yet further embodiment, the method further includes steps for building the end-to-end network, and training the end-to-end network based on animation curves derived from rendered video and animation curves used to generate the rendered video.

In still another additional embodiment, building the end-to-end network includes identifying a set of models used to generate animation parameters, modifying the set of models, and training a new set of layers based on the modified set of models to generate animation curves.

In a still further additional embodiment, modifying the set of models includes at least one of freezing layers of the set of models and removing layers from the set of models.

In still another embodiment again, training the new set of layers includes using outputs from the modified set of models as inputs to the new set of layers.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, animation systems in accordance with embodiments of the invention are illustrated. In various embodiments, animation systems can include a cascading model and an animation inference engine (e.g., animation curves and renderer) for generating rendered training data. Cascading models in accordance with numerous embodiments of the invention can include multiple component models that are trained to identify various animation parameters (e.g., landmarks, facial basis, emotion embeddings, etc.) from multimedia content (e.g., text, video, audio, etc.). Component models in accordance with numerous embodiments of the invention can be trained separately, co-trained, and/or trained for multiple tasks. In a variety of embodiments, animation parameters can be used by an inference engine to generate animation curves, and/or animated video, which can be used as rendered training data.

Rendered training data in accordance with several embodiments of the invention can be used to train an end-to-end network to directly generate animation curves based on multimedia content. End-to-end networks in accordance with many embodiments of the invention can be based on a cascading model composed of multiple component models, where the component models are trained to generate various animation parameters. In numerous embodiments, component models of the cascading model can be used to build the end-to-end model (e.g., using layers and/or weights of the component models, etc.). In some embodiments, end-to-end models can include new layers that take inputs from layers of the component models to output animation curves. Training of the new layers in accordance with some embodiments of the invention can be based on rendered video and/or ground truth animation curves generated by a cascading model.

Figure 1:
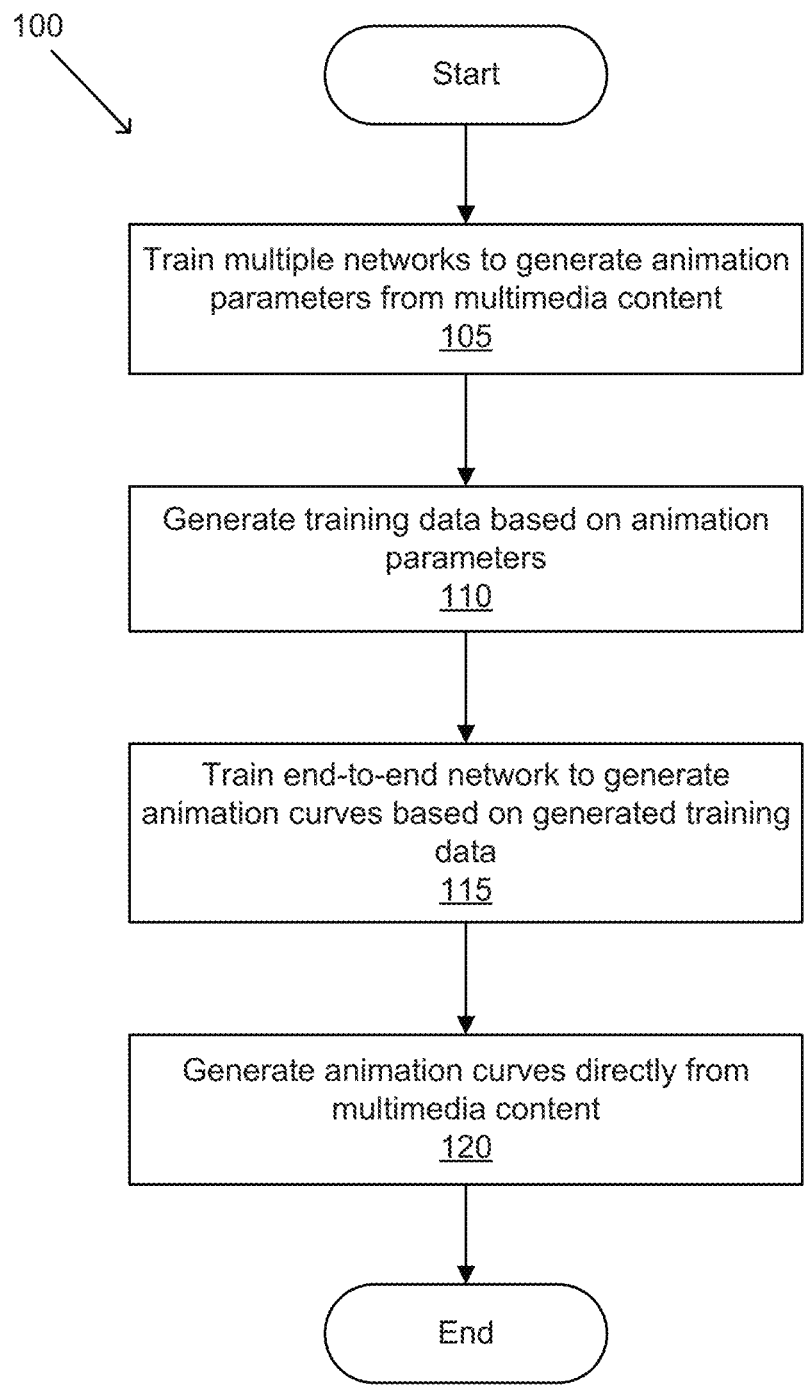
FIG. 1 conceptually illustrates a process for generating animation curves from multimedia content in accordance with an embodiment of the invention.

An example of a process for generating animation curves from multimedia content in accordance with an embodiment of the invention is illustrated in FIG. 1. Process 100 trains (105) multiple networks to generate animation parameters from multimedia content. Multimedia content in accordance with a variety of embodiments of the invention can include (but is not limited to) video, audio, and/or text. In various embodiments, different models are trained to take different elements of the multimedia content (e.g., video, audio, and/or text) to generate the animation parameters. Animation parameters in accordance with various embodiments of the invention can include (but are not limited to) landmarks, emotion embeddings, and/or facial attributes.

Process 100 generates (110) training data based on the generated animation parameters. In many embodiments, the generated training data can include rendered video of a digital avatar in a 3D space, along with the animation curves used to render the video. Generated training data in accordance with a number of embodiments of the invention can include animations of multiple different models, in a variety of different conditions. In many embodiments, edge parameters can define parameters for a number of "edge cases" that can be used to generate videos that may be difficult to process. In such a manner, the training data can target edge cases to make an end-to-end network robust to various difficult real-life situations, such as (but not limited to) harsh lighting, poor lighting, non-frontal faces, motion blur, multiple faces in camera view, partial occlusions, and/or low bandwidth.

Process 100 trains (115) an end-to-end network to generate animation curves based on the generated training data. Training an end-to-end network in accordance with certain embodiments of the invention can allow for real-time processing on a low-power device (e.g., a mobile device) that is invariant to facial hair and lighting. In several embodiments, end-to-end networks can be trained to use layers of a generative model that was trained to predict landmarks without any video inputs. When such layers are used as inputs to the layers of the end-to-end network, the network can develop the ability to predict animation curves even when video is of low quality or unavailable.

Process 100 generates (120) animation curves directly from multimedia content. End-to-end networks in accordance with some embodiments of the invention can directly generate animation curves without separately identifying landmarks, emotion, facial basis, etc. In several embodiments, end-to-end networks can be used to generate animation curves in a variety of applications, including (but not limited to) social media, live streaming, avatar puppeteering, animated emojis, teleconferencing, video chat, and multimedia content creation.

While specific processes for training networks and generating animation curves are described above, any of a variety of processes can be utilized to train networks and generate animations as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to animation curves, the techniques disclosed herein may be used in any type of animation, including directly regressing 3D animated positions of the mesh vertices of an avatar.

Animation Parameters

Figure 2:
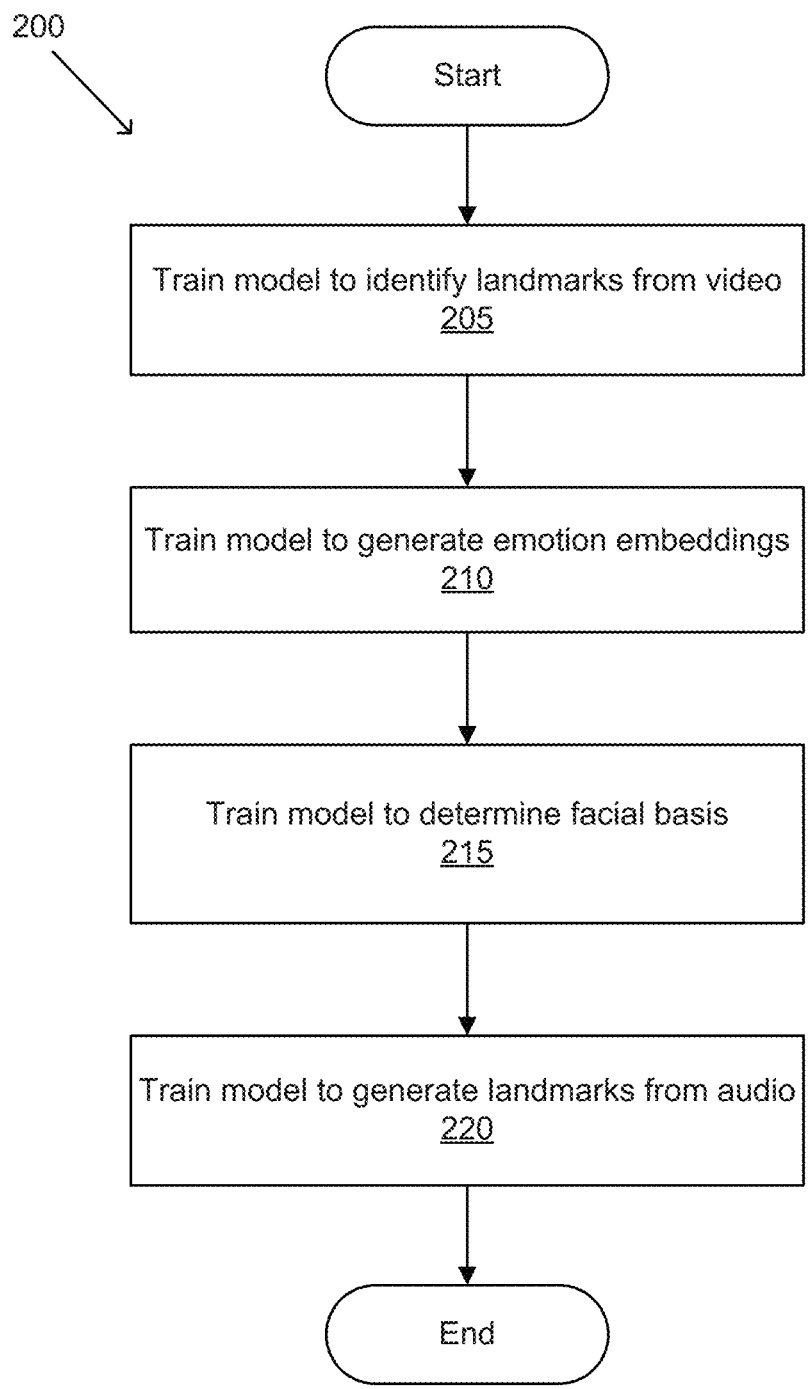
FIG. 2 conceptually illustrates a process for training networks to generate animation parameters in accordance with an embodiment of the invention.

An example of a process for training a cascading network of component models to generate animation parameters in accordance with an embodiment of the invention is illustrated in FIG. 2. Cascading networks in accordance with many embodiments of the invention can include multiple component networks for identifying different animation parameters from multimedia content.

Process 200 trains (205) a model to identify landmarks from video. Landmarks in accordance with various embodiments of the invention can indicate the location of specific points on a user's face (e.g., eyes, nose, ends of the mouth, etc.). In numerous embodiments, landmarks for different frames of video can be used to direct the animation of a 3D rig. Models for identifying landmarks from video in accordance with a number of embodiments of the invention can include deep neural networks, such as (but not limited to) recurrent neural networks (RNNs), convolutional neural networks (CNNs), etc.

Process 200 trains (210) a model to generate emotion embeddings. In certain embodiments, emotion embeddings can be used to provide a measure of emotion as an input to an inference engine, rather than determining emotion from landmarks. This can allow the emotional response to be more robust because pixel data can be used to gauge emotion, allowing for the capture of micro-expressions that may not be readily detectable in landmarks or other animation parameters. Emotion embeddings in accordance with a number of embodiments of the invention can be trained to indicate a perceptual similarity of emotions between images, rather than relying on labels of the emotions. Some methods for generating emotion embeddings in accordance with several embodiments of the invention are described in greater detail in Vemulapalli, R., & Agarwala, A. (2018). "A Compact Embedding for Facial Expression Similarity," the disclosure of which related to embeddings is incorporated by reference herein in its entirety.

Process 200 trains (215) a model to determine facial basis. Facial basis in accordance with many embodiments of the invention can indicate a general structure of a user's face and/or other facial attributes, such as (but not limited to) gender, age, face shape, face width, and/or eye shape.

Process 200 trains (220) a model to generate landmarks from audio. The use of audio as an additional input can provide many benefits to generating animation curves. In a variety of embodiments, audio can be used to generate detailed landmarks for specified regions (e.g., lips and mouth region), where audio can provide more visually pleasing animations than using video alone.

Alternatively, or conjunctively, audio in accordance with certain embodiments of the invention can be used to generate landmarks for other regions of the face and/or to determine head pose. In several embodiments, audio-only landmarks can be used when landmarks from video are not of a good quality and/or when there is no video data available at all. In certain embodiments, landmarks for different regions can be generated using separate models. For example, processes in accordance with some embodiments of the invention can use a deep speech network that takes audio and/or text as input to identify landmarks for the lips/mouth region, while using a generative model (e.g., a generative adversarial network (GAN)) to identify landmarks for other portions of the face (e.g., eyebrows), head pose, and/or other parts of the body.

While specific processes for training a cascading network to generate animation parameters are described above, any of a variety of processes can be utilized to train networks as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although many of the examples are described as separate models, one skilled in the art will recognize that similar systems and methods can be used in a variety of applications, including (but not limited to) co-training multiple functions in a single model and/or incorporating pre-trained models, without departing from this invention.

Figure 3:
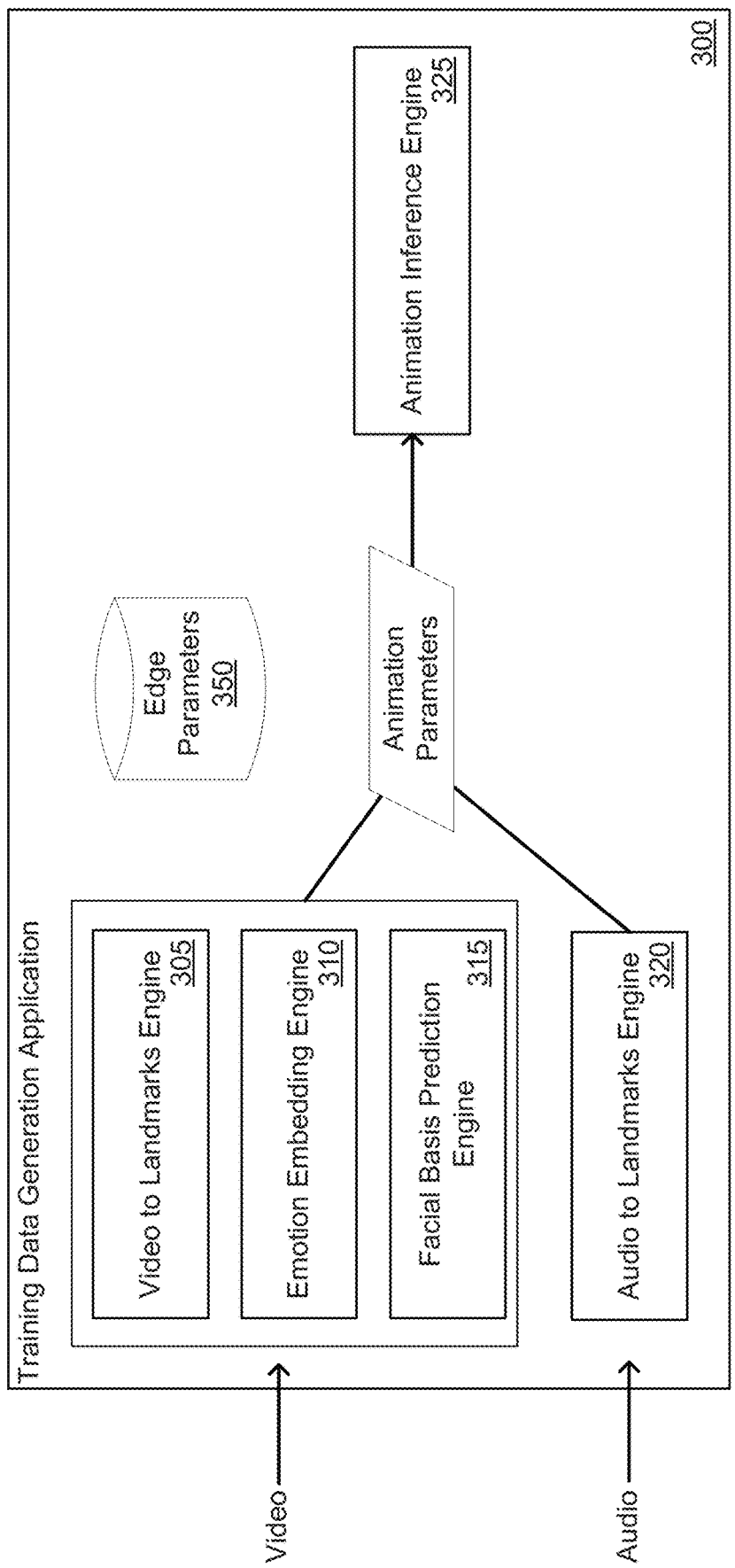
FIG. 3 illustrates an example of a training data generation application in accordance with an embodiment of the invention.

An example of a training data generation application in accordance with an embodiment of the invention is illustrated in FIG. 3. Training data generation application 300 includes video-to-landmarks engine 305, emotion embedding engine 310, facial basis prediction engine 315, audio-to-landmarks engine 320, animation inference engine 325, and edge parameters 350.

Video-to-landmarks engines in accordance with some embodiments of the invention can take images (e.g., frames of video) as input to identify landmarks within the images. In several embodiments, training video-to-landmarks engines can include computing a loss based on a difference between true landmarks or landmarks annotated (e.g., manually and/or automatically) in an image. Such a loss can include (but is not limited to) a root mean squared error (RMSE) landmark loss and/or a consensus landmark loss.

In many embodiments, emotion embedding engines can take images as input to generate a representation of emotion or expression in the image. In several embodiments, training emotion embedding engines can include calculating a loss based on a classification of the image when compared to an annotation of emotion for the image. Alternatively, or conjunctively, loss for training emotion embedding engines in accordance with a number of embodiments of the invention can include an emotion triplet loss that can be used to train an emotion embedding engine to reduce a distance in emotion embedding space between images with similar emotions and to increase a distance between images with differing emotions.

Facial basis prediction engines in accordance with various embodiments of the invention can be used to determine a facial basis for a user. Training of facial basis prediction engines can be based on a computed loss based on annotated training data.

In some embodiments, audio-to-landmarks engines can take audio (e.g., speech samples) as input to generate landmarks for a rig based on the spoken audio. Alternatively, or conjunctively, audio-to-landmarks engines in accordance with some embodiments of the invention can take text as input to generate the landmarks. In numerous embodiments, audio-to-landmarks engines can include a recurrent deep speech network that processes spectrograms to generate corresponding landmarks. Audio-to-landmarks engines in accordance with various embodiments of the invention can be trained to generate landmarks for specific areas of a face, such as (but not limited to) mouth, lips, and/or jaw.

Animation inference engines in accordance with a variety of embodiments of the invention can take animation parameters generated by the various engines to generate animation curves and/or animated video. In certain embodiments, animation inference engines are "classic" mappers that can generate animation curves based on landmarks, emotion embeddings, and/or facial basis.

In a variety of embodiments, animation inference engines can be used to generate ground truth animation. In numerous embodiments, animation inference engines can be used to generate high quality ground truth animation by using good input data (e.g., multimedia content with plain backgrounds, low blur, good lighting, etc.). In several embodiments, high quality ground truth animations can then be modified based on edge parameters to generate samples for edge cases. Edge parameters in accordance with a variety of embodiments of the invention can include (but are not limited to) poor lighting, blur, jitter, obfuscations, and/or noisy backgrounds.

Although a specific example of a training data generation application is illustrated in this figure, any of a variety of training data generation applications can be utilized to perform processes for generating training data similar to those described herein as appropriate to the requirements of specific applications in accordance with embodiments of the invention.

Figure 4:
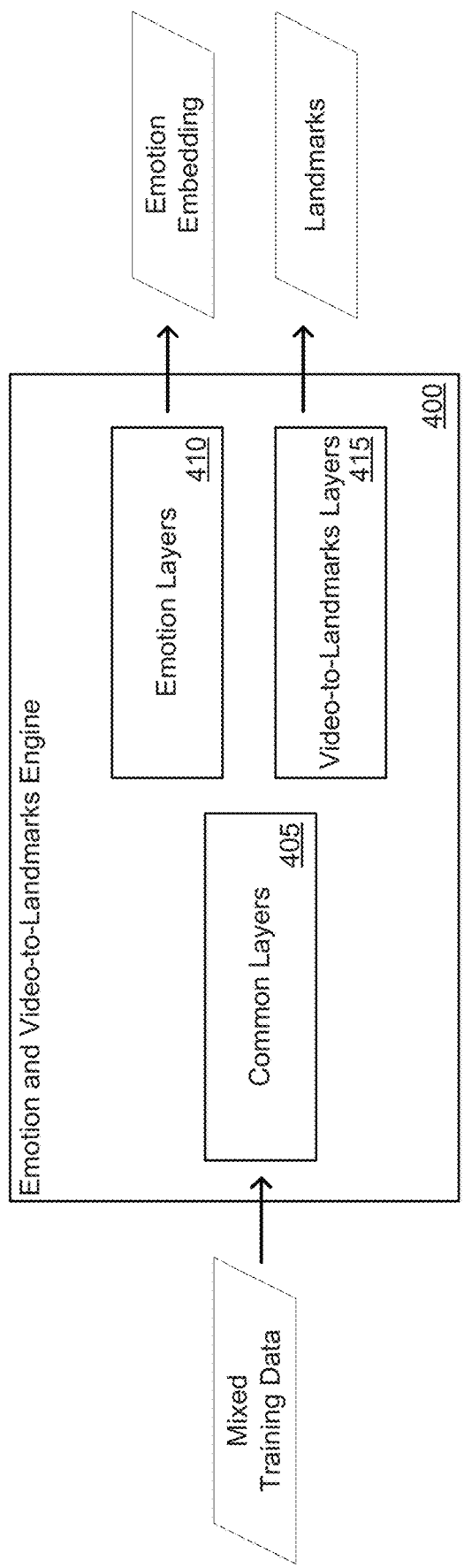
FIG. 4 illustrates an example of co-training an emotion and video-to-landmarks engine in accordance with an embodiment of the invention.

As described above, processes in accordance with a number of embodiments of the invention can co-train a single model to perform a number of different functions, such as (but not limited) to co-training emotion embeddings and video-to-landmarks. An example of co-training an emotion and video-to-landmarks engine in accordance with an embodiment of the invention is illustrated in FIG. 4. Emotion and video-to-landmarks (EVTL) engine 400 includes common layers 405, emotion layers 410, and video-to-landmark layers 415. EVTL engines (or networks) in accordance with some embodiments of the invention can be light, modular networks.

Layers of EVTL engines in accordance with some embodiments of the invention can be based on combinations of depthwise and pointwise convolutions. With depthwise convolutions in accordance with a variety of embodiments of the invention, filters can act on a single channel. Pointwise convolutions in accordance with some embodiments of the invention can use a 1×1 kernel, such that it can iterate through every single point and can act over multiple channels. In a variety of embodiments, modules can include residual connections. EVTL networks in accordance with certain embodiments of the invention can include a final linear, fully-connected layer to generate landmarks.

In numerous embodiments, EVTL engines can include common layers that are shared for training different branches of a network. In the example of FIG. 3, common layers 405 are shared by the emotion layers 410 and the video-to-landmark layers 415. Co-training common layers in accordance with certain embodiments of the invention can result in better accuracies, as common layers can be trained to identify features that are important for multiple functions. In addition, co-training combined networks can result in faster inference due to the shared calculations. Co-training in accordance with certain embodiments of the invention back-propagates different losses from multiple different branches through the common layers.

In several embodiments, EVTL engines can be trained using mixed batches for training. Mixed batches in accordance with several embodiments of the invention can include pairs of images with landmark annotations. In certain embodiments, each pair of images can be an augmented and transformed version of an original image with its transformed landmarks. In some embodiments, mixed batches can include pairs of triplets of emotion. Each triplet represents three different expressions or emotions in which the most different expression is annotated as such. Each pair (of triplets) corresponds to a different transformation of each of the images in the triplet.

Training EVTL engines in accordance with some embodiments of the invention can include passing one or more images (e.g., an annotated image pair, emotion triplet pair, etc.) through the common and branch layers of an EVTL engine to compute one or more losses. Branches of a co-trained network can be trained on different loss functions to generate different outputs and to identify different features. In certain embodiments, a combined network can be split after training, so that only one branch (or set of layers) is used for a cascading model and/or for an end-to-end network, as appropriate to the requirements of an application.

In numerous embodiments, video-to-landmark layers can be trained to identify landmarks based on video inputs. In the case of an annotated image pair, each image of the annotated image pair can be passed through the common layers and the video-to-landmark layers, and a landmark loss can be computed and backpropagated back through the video-to-landmark layers and the common layers. Landmark losses in accordance with some embodiments of the invention can include (but are not limited to) a root mean squared error (RMSE) error and/or a consensus landmark loss. In certain embodiments, RMSE landmark error can measure an error between predicted landmarks and labeled landmarks for a single image. Consensus landmark loss can measure the RMSE between landmark predictions of two images in a pair. In many embodiments, consensus landmark loss can be used with a larger set of non-annotated images, which represent a wide spectrum of expressions in order to reduce jitter.

Emotion layers in accordance with some embodiments of the invention can be trained on an emotion loss. Emotion loss in accordance with several embodiments of the invention can include (but is not limited to) emotion triplet loss, which makes the distance in an emotion embedding space between images with most similar emotion closer than the distance between each of them to the third image.

Figure 5:
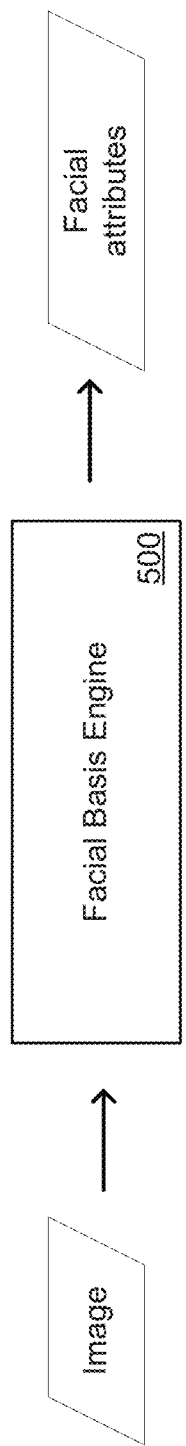
FIG. 5 illustrates an example of training a facial basis engine in accordance with an embodiment of the invention.

In a number of embodiments, one or more component networks of a cascading network are trained independently from the other component networks. In various embodiments, one or more of the component networks are pre-trained models that can be plugged into a cascading model. An example of training a facial basis engine in accordance with an embodiment of the invention is illustrated in FIG. 5. Facial basis engine 500 takes an image (e.g., a set of one or more frames of video) as input and identifies facial attributes that describe a facial basis for an individual identified in the set of frames. Facial attributes in accordance with several embodiments of the invention can include (but are not limited to) gender, age, face shape, face width, and/or eye shape. In certain embodiments, facial basis engines can produce a feature vector that represents the attributes of a face captured in the image. Facial basis engines in accordance with many embodiments of the invention can be a light network based on combinations of depthwise and pointwise convolutions, with a final linear fully connected layer for generating the output facial attributes.

In certain embodiments, facial basis engines are trained using multi-task training, where several facial attributes (e.g., gender, age, face shape, face width, eye shape, etc.) are trained simultaneously. Like co-training, multi-task training can allow a model to identify features that are more broadly useful in identifying the various different facial attributes, without overspecializing on a single task. Training facial basis engines in accordance with some embodiments of the invention can include passing one or more images through the facial basis engines to compute one or more losses. In various embodiments, facial basis engines do not require that each sample from the training data be completely annotated (i.e., for every attribute). Processes in accordance with various embodiments of the invention can use masks to filter out non-annotated attributes. In many cases, training data with multiple attributes may not have an even distribution of examples with various attributes. In several embodiments, facial basis engines can use a weighted loss function (such as, but not limited to, weighted cross entropy loss) to compensate for unbalanced classes. Because facial basis analysis can be done periodically, and does not need to be run on every frame of video, facial basis engines in accordance with numerous embodiments of the invention can be implemented as a separate network from other networks of the cascading model.

Figure 6:
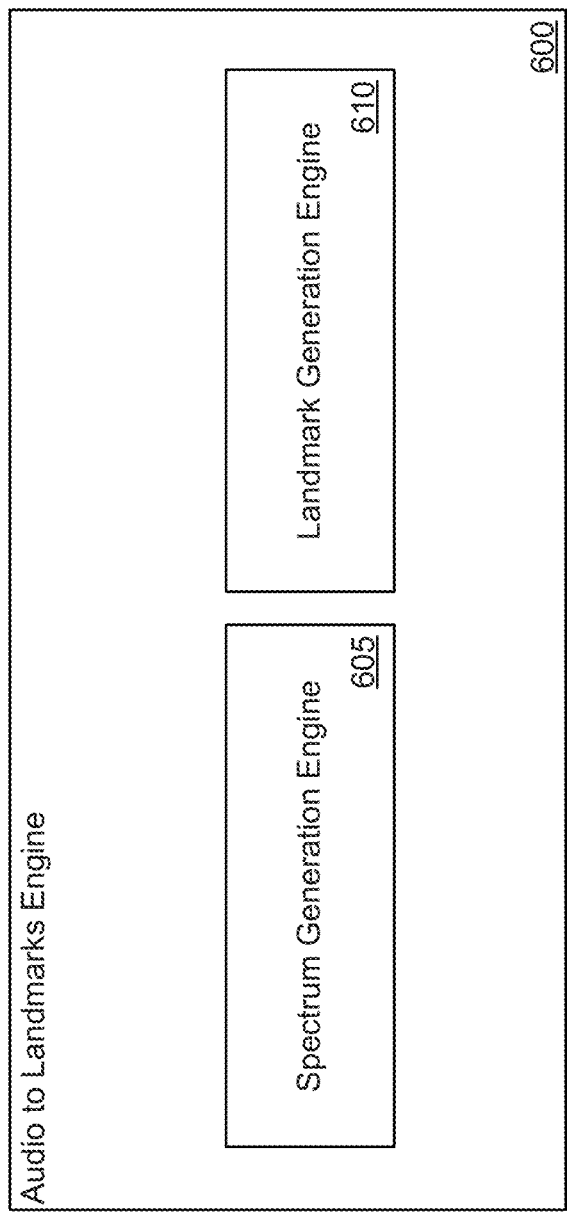
FIG. 6 illustrates an example of an audio to landmarks engine in accordance with an embodiment of the invention.

In addition to processing video, animation systems in accordance with a variety of embodiments of the invention can use audio and/or text to generate animation parameters. An example of an audio to landmarks engine in accordance with an embodiment of the invention is illustrated in FIG. 6. Audio-to-landmarks engine 600 includes a spectrum generation engine 605 and landmark generation engine 610. Spectrum generation engines in accordance with numerous embodiments of the invention can be used to generate a spectrum from captured audio (e.g., as part of multimedia content).

In many embodiments, audio-to-landmarks engines can take audio as input. Spectrum generation engines can compute spectrum features, e.g., MFCC, from audio input, and then feeds these features into a landmark generation engine. Landmark generation engines in accordance with a variety of embodiments of the invention can include a deep speech network. Deep speech networks in accordance with various embodiments of the invention include several 1-d convolutional layers, recurrent layers, and convolutional layers. In certain embodiments, deep speech networks can be pre-trained on a speech-to-text task. The architecture of deep speech can be naturally adapted to text input because the architecture includes RNN building blocks. In many embodiments, besides processing spectrograms, RNNs can also be used to process text as input. Landmark generation engines in accordance with several embodiments of the invention can generate speech-related landmarks, e.g., lips and chins. In numerous embodiments, a sequence of animation is generated based on the generated speech-related landmarks.

For the training phase, landmark generation engines in accordance with many embodiments of the invention can be trained using one or more losses. Losses in accordance with various embodiments of the invention can include (but are not limited to) position loss, velocity loss and paired key distance loss. Position loss in accordance with certain embodiments of the invention can be used for general optimization, while paired key distance loss can optimize lip movements. Paired keys refer to the keypoints which are tightly associated/related when the lip makes a shape (e.g., upper middle point and lower middle point). For different shapes, the distances of a paired key are also different, so encoding this term in the objective function can be helpful.

Audio-to-landmarks engines in accordance with certain embodiments of the invention can be used for inferring lips and/or jaw landmarks for accurate lipsync. In several embodiments, audio-to-landmarks engines use a combination of audio and video data (e.g., images, image feature vectors, etc.) to more accurately identify landmarks for a portion of audio. Audio-to-landmarks engines in accordance with several embodiments of the invention can generate landmarks, where the final landmarks for a portion of the multimedia content is computed based on a combination of landmarks generated by both a video-to-landmarks engine and an audio-to-landmarks engine.

In numerous embodiments, audio-to-landmarks engines can include an engine for deriving other landmarks beyond the mouth region. In various embodiments, audio-to-landmarks engines can be used to generate landmarks for other portions of the face, head pose, and/or body movements based on audio. Audio-to-landmarks engines in accordance with various embodiments of the invention can include separate models for generating lipsync landmarks and for generating more general landmarks.

Figure 7:
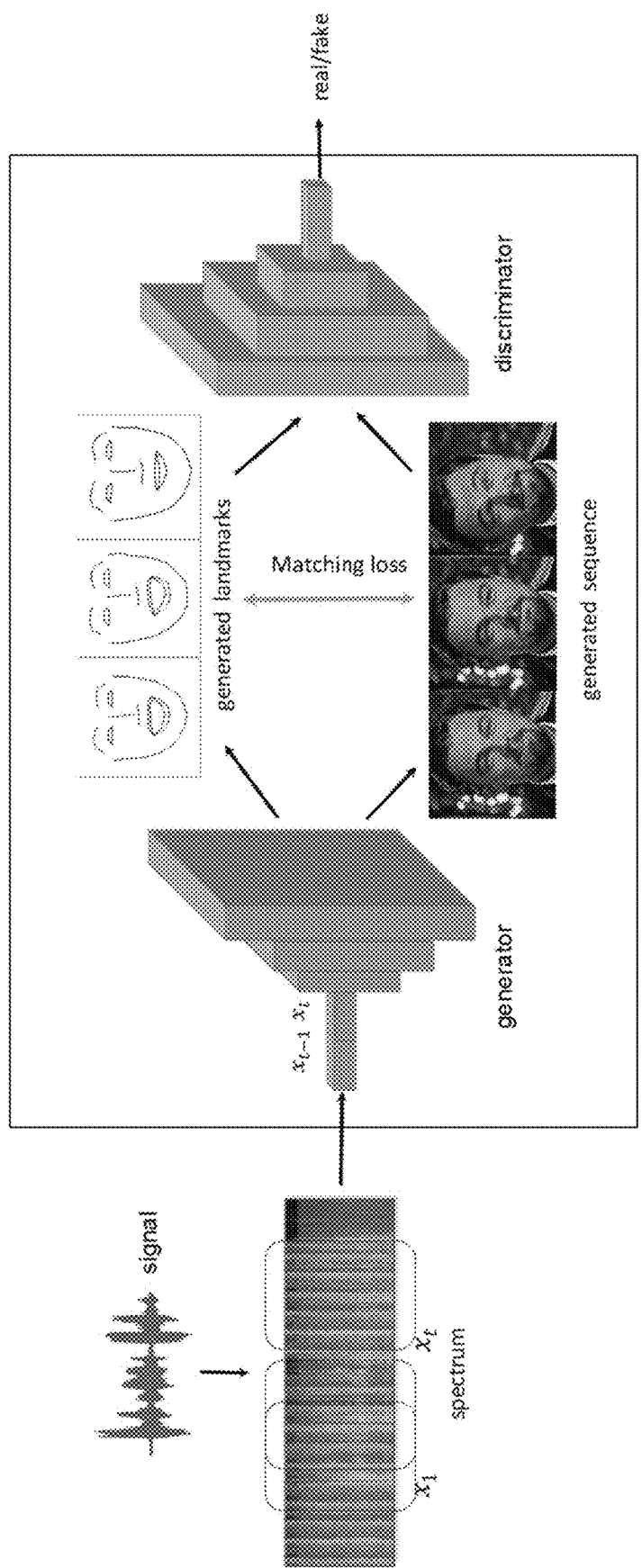
FIG. 7 illustrates an example of an audio GAN in accordance with an embodiment of the invention.

In many embodiments, an audio-to-landmarks engine can include an audio generative models for generating more general landmarks from audio. An example of an audio GAN in accordance with an embodiment of the invention is illustrated in FIG. 7. In numerous embodiments, GANs can be trained to generate animation parameters (such as, but not limited to, landmarks, animations, curves, etc.) based on audio. In a variety of embodiments, GANs can include a generator and a discriminator, where the generator generates visual data (e.g., landmarks and/or video), while the discriminator attempts to discriminate real visual data from generated visual data. Such adversarial competition is the key idea behind GAN models.

In this example, the generator takes as input a sequence of audio features and outputs a sequence of landmarks and photorealistic images. The discriminator performs as a critic, helping the generator to improve the quality of generated images and landmarks. In numerous embodiments, a novel objective can be used for training, namely, minimizing the match score of generated landmarks and images. Specifically, given the generated images, processes in accordance with certain embodiments of the invention can detect the landmarks using a neural network based detector. The generated landmarks can be treated as groundtruth. Processes in accordance with several embodiments of the invention can then minimize the distance from the resulting landmarks to the generated landmarks. In various embodiments, such matching losses can help generator to avoid artifacts and to generate more realistic faces. Losses for training a GAN can include (but are not limited to) Wasserstein-related distances.

Audio generative models in accordance with several embodiments of the invention can be used to model head movement. Instead of using a static head template as in the existing works, processes in accordance with various embodiments of the invention can generate realistic head movement and facial expressions purely from audio.

Although the example described herein describes a GAN to generate landmarks from audio, one skilled in the art will recognize that other types of generative models can be used in a variety of applications, including (but not limited to) variational autoencoders and/or autoregressive models, without departing from this invention. In many embodiments, rather than separate models, deep speech can be integrated into a generative framework so that GAN loss can be used in conjunction with other losses (e.g., position, velocity, and paired key loss).

Rendered Training Data

Creating animation ground truth can be very difficult as different animators can view the same video and animate things very differently. Processes in accordance with numerous embodiments of the invention can allow for a simplified pipeline for generating significant amounts of rendered training data, which can be especially important in the training of neural networks. In such a manner, rendered training data can have a broad range of variety, while maintaining consistent ground truth labels. In several embodiments, new ground truth training data can be rendered (in CGI) for edge cases scenarios (bad lighting, extreme camera poses, wide variations in age & face types, occlusions (hair, hand, etc).

Figure 8:
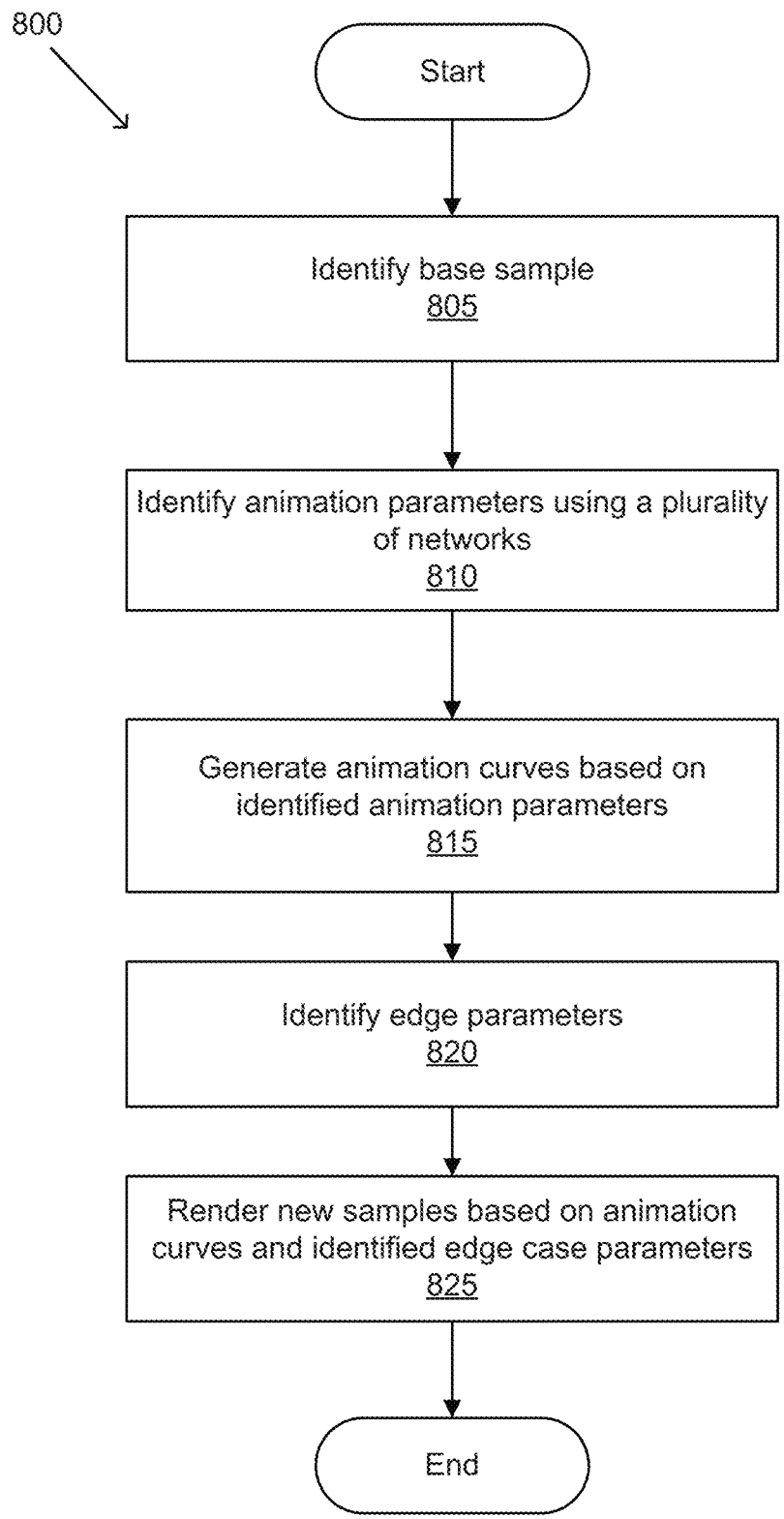
FIG. 8 conceptually illustrates a process for generating rendered training data in accordance with an embodiment of the invention.

An example of a process for generating rendered training data in accordance with an embodiment of the invention is illustrated in FIG. 8. Process 800 identifies (805) a base sample. Base samples in accordance with a number of embodiments of the invention can include a high-quality sample (e.g., good lighting, low blur, clean backgrounds, etc.). In a number of embodiments, base samples are generated based on situations that have been identified as failed cases (e.g., head positions that lead to poor landmark identification).

Process 800 identifies (810) animation parameters using multiple models. Animation parameters in accordance with numerous embodiments of the invention can include (but are not limited to) landmarks, emotion embeddings, and/or facial attributes. In some embodiments, the multiple models can be a part of a cascading model. Cascading models can include one or more models that can be co-trained, pre-trained, and/or trained separately.

Process 800 generates (815) animation curves based on the identified animation parameters. In some embodiments, generated curves are high quality curves because some problem situations (e.g., awkward head positions) can be reproduced in an optimized environment (e.g., with good lighting and backgrounds).

Process 800 identifies (820) edge parameters. Edge parameters in accordance with various embodiments of the invention can include (but are not limited to) skin color, age, lighting, blur, and/or backgrounds. In some embodiments, edge parameters can be used as part of a rendering pipeline to simulate various different conditions for multimedia presentation.

Process 800 renders (825) new samples based on animation curves and identified edge case parameters. Animation curves in accordance with certain embodiments of the invention can be applied to many other faces and/or environments to generate rendered training data for training an end-to-end animation engine. In this way, large quantities of rendered training data can be generated in accordance with numerous embodiments of the invention, which can be labeled with a "true" animation curve, which was used to render the particular training data.

In certain embodiments, rendered training data can be stored (e.g., at a local storage, in the cloud, on remote servers, etc.) and used for training an end-to-end network. Systems and methods in accordance with some embodiments of the invention can generate the rendered training data (e.g., ground truth animation curves and animations) in a live fashion, using a cascading network to generate rendered training data as an end-to-end network is being trained.

While specific processes for generating rendered training data are described above, any of a variety of processes can be utilized to render training data as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 9:
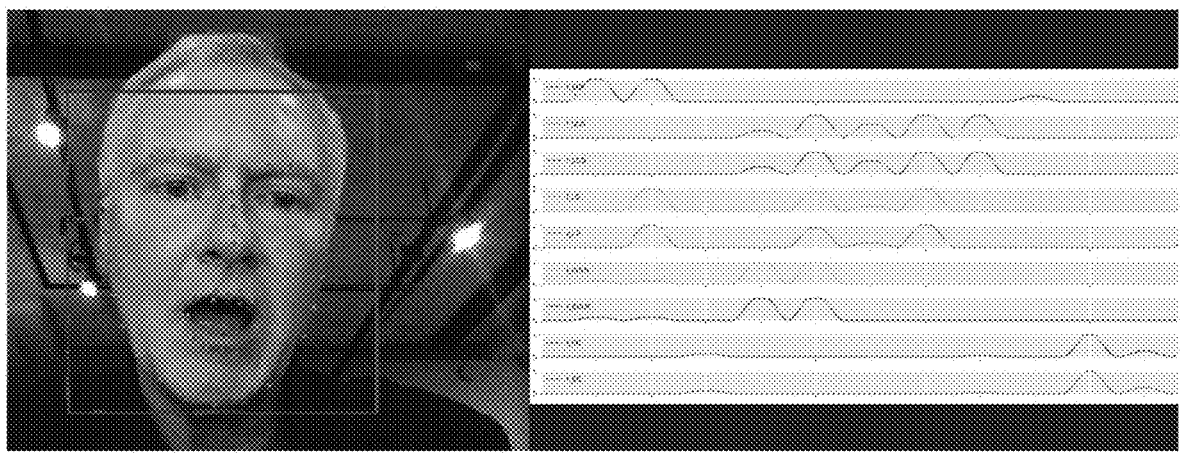
FIG. 9 illustrates examples of rendered training data in accordance with an embodiment of the invention.
Figure 9:
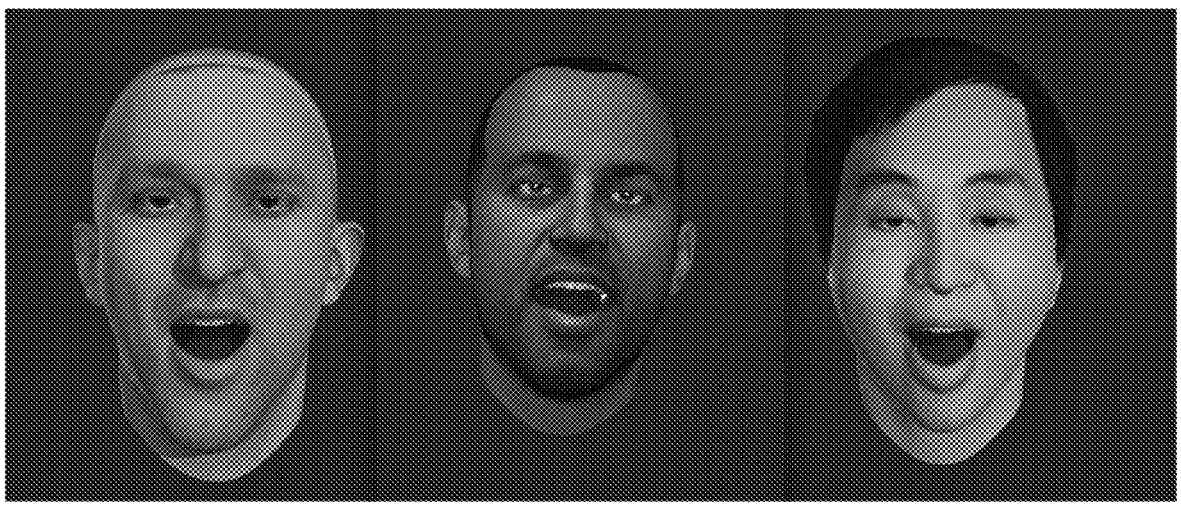

Examples of rendered training data are illustrated in FIG. 9. In the first stage 905, the left side shows video of a user with identified landmarks. The right side shows animation curves generated based on the video using a classic mapper.

The second stage 905 shows three examples of heads that were rendered based on the animation curves generated in the first stage. In this example the heads have various different characteristics, such as ethnicity, hair style, facial hair, etc. Rendered training data in accordance with various embodiments of the invention can include other variations, such as (but not limited to) different backgrounds, lighting conditions, blur, gender, accessories, etc.

End-to-end Animation Curves

Figure 10:
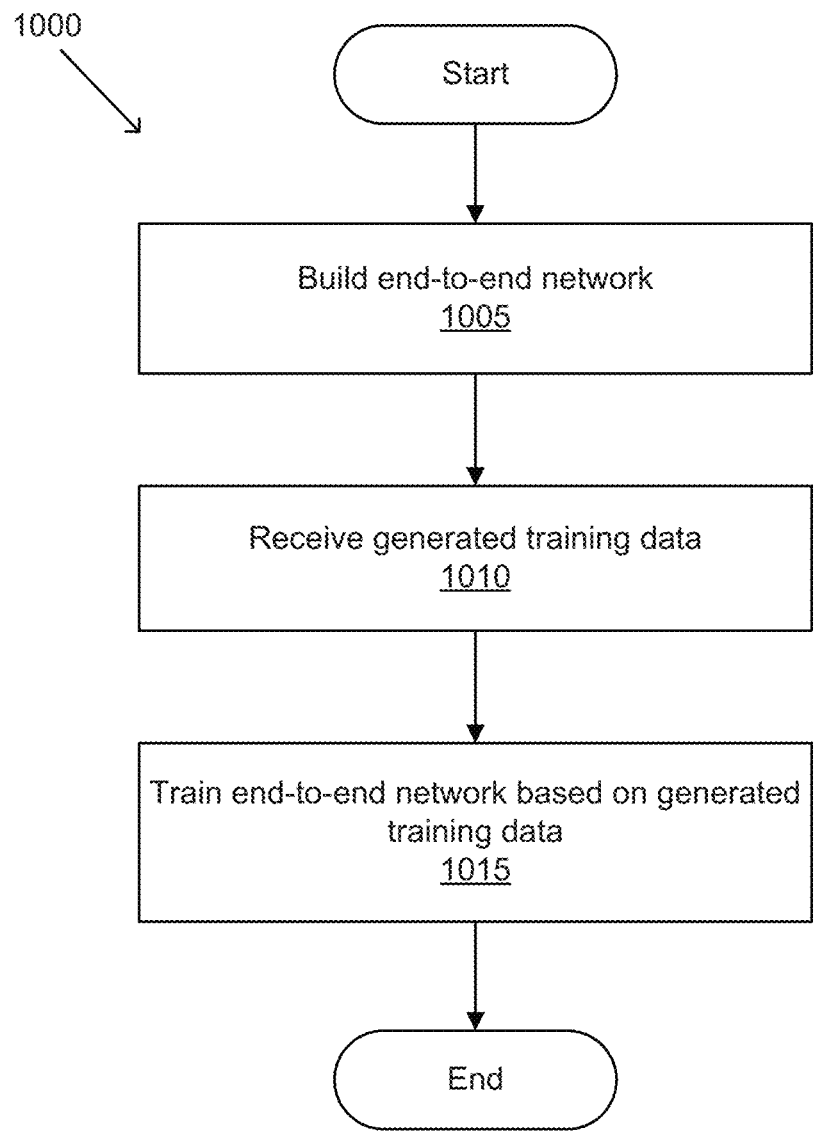
FIG. 10 conceptually illustrates a process for training an end-to-end network to generate animation curves in accordance with an embodiment of the invention.

Traditional methods for generating animations can have trouble in many real world situations because they are based on numerical optimization, and can require special logic and heuristics based on the output from the various networks that feed into it (landmarks, emotion, basis and audio-landmarks). End-to-end networks in accordance with certain embodiments of the invention can learn to handle difficult situations because they can learn from ground truth data for animation curves. An example of a process for training an end-to-end network to generate animation curves in accordance with an embodiment of the invention is illustrated in FIG. 10. Process 1000 builds (1005) an end-to-end network. Building an end-to-end network can include various steps including, but not limited to, removing layers, freezing weights of layers, adding new layers, and/or transferring weights from a cascading model to the end-to-end network. In various embodiments, layers of multiple component models can be connected as inputs to new layers of the end-to-end network. New layers in accordance with various embodiments of the invention can include a new set of fully connected layers to generate animation curves.

Process 1000 receives (1010) generated training data. Rendered training data in accordance with certain embodiments of the invention can be produced by a CGI pipeline, such as (but not limited to) a rendering engine. In certain embodiments, generated training data can include (but is not limited to) annotated real world video, simulated video that is modified based on edge parameters, and/or rendered animations. Training data in accordance with some embodiments of the invention can be generated to include various labels, such as (but not limited to) landmark positions, speech, text, audio, emotion, audio events, environmental conditions, skin tone, animation curves, and/or tongue positions.

Process 1000 trains (1015) the end-to-end network based on the generated training data. In some embodiments, end-to-end networks can be trained using the animation curve used to render a sample of training data as ground truth, calculating a curve loss between the true animation curve and the animation curve predicted by the end-to-end network. In this manner, the curve loss can be backpropagated back over the layers of the end-to-end network, training them to generate better animation curves. In certain embodiments, layers from the cascading model are frozen, and only the new layers are trained based on the curve loss.

By training an end-to-end system that combines generates great ground truth animations, renders new ground truth for edge cases, and does not need special logic/heuristics, end-to-end networks can handle edge cases internally, and can seamlessly blend between audio and video signals for producing animation from input data.

While specific processes for training an end-to-end network are described above, any of a variety of processes can be utilized to train an end-to-end network as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 11:
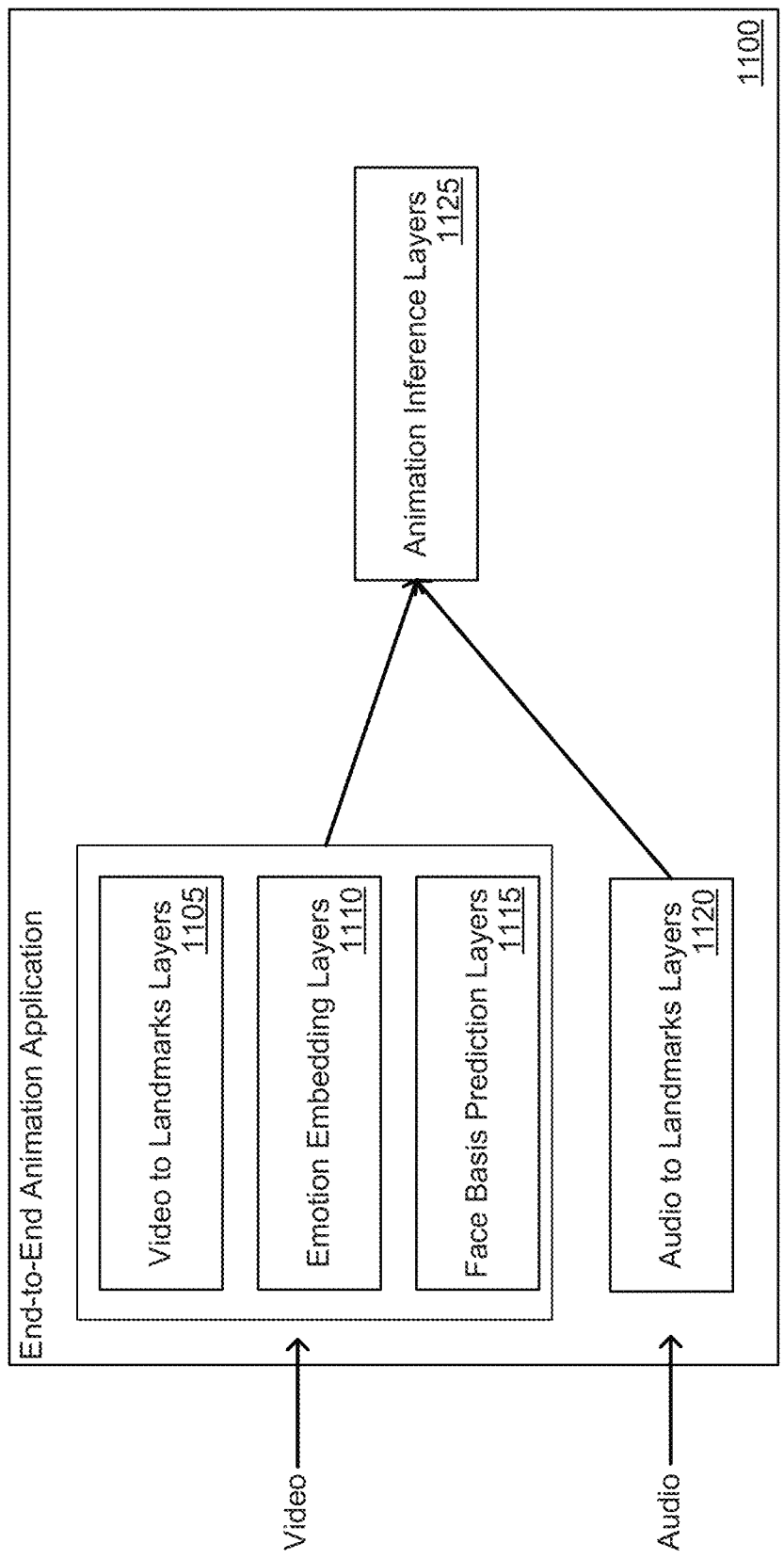
FIG. 11 illustrates an example of an end-to-end animation application in accordance with an embodiment of the invention.

An example of an end-to-end animation application in accordance with an embodiment of the invention is illustrated in FIG. 11. End-to-end animation application 1100 includes video-to-landmarks layers 1105, emotion embedding layers 1110, facial basis prediction layers 1115, audio-to-landmarks layers 1120, and animation inference layers 1125. Unlike training data generation applications described above, end-to-end animation applications in accordance with a number of embodiments of the invention do not generate intermediate animation parameters from input multimedia content to compute animation curves. In numerous embodiments, the various layers of an end-to-end animation application are similar to the models of a training data generation application, without a last few layers (e.g., fully connected layers). Video-to-landmarks layers, audio-to-landmarks layers, and/or animation inference layers in accordance with numerous embodiments of the invention can use layers and/or weights from corresponding models trained as a part of a cascading model.

Audio-to-landmarks layers for facial landmarks (e.g., eyebrows, and/or nose), head pose, and/or other elements (e.g., hands, shoulders, etc.) can help make the end-to-end model robust to bad and/or missing video. In numerous embodiments, using audio generative models to identify landmarks can allow processes to adapt and to generate more features that can be used by animation inference layers to generate animation curves, especially when video landmarks are of poor quality and/or missing.

Although a specific example of an end-to-end animation application is illustrated in FIG. 11, any of a variety of end-to-end animation applications can be utilized to perform processes for end-to-end animation similar to those described herein as appropriate to the requirements of specific applications in accordance with embodiments of the invention.

Figure 12:
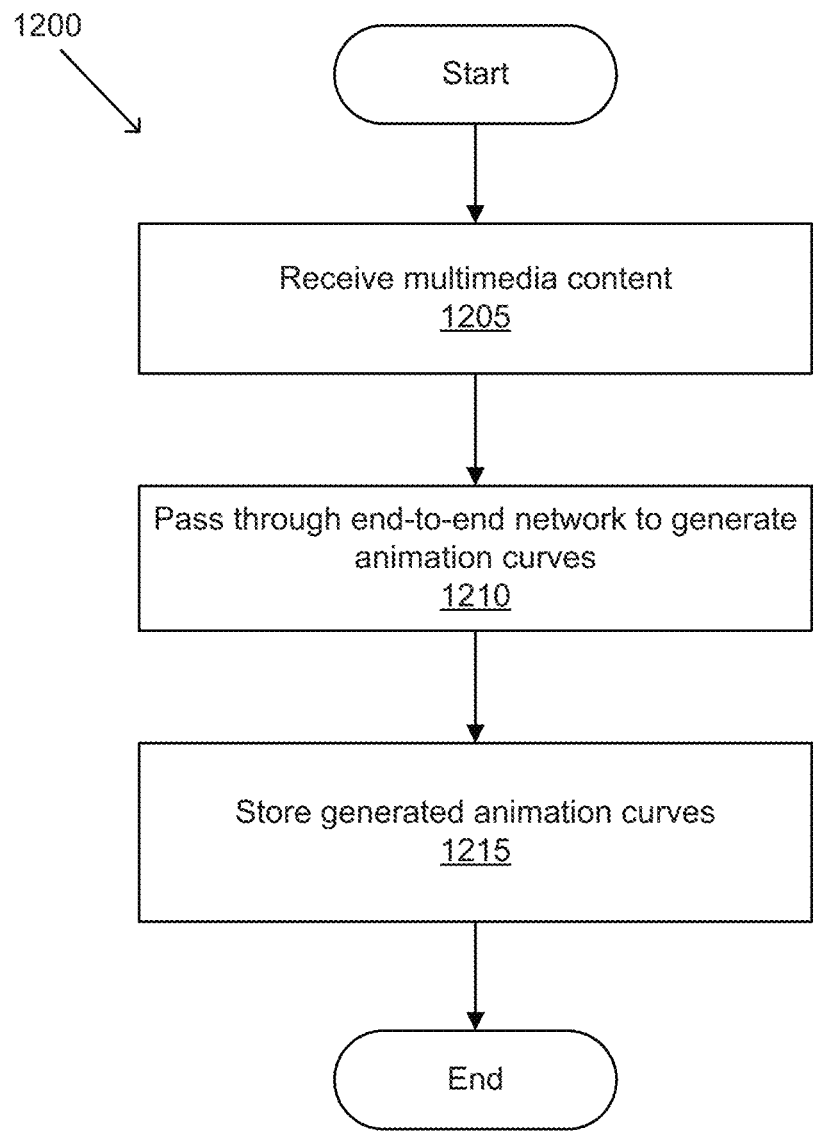
FIG. 12 conceptually illustrates a process for generating animation curves in accordance with an embodiment of the invention.

An example of a process for generating animation curves with an end-to-end model in accordance with an embodiment of the invention is illustrated in FIG. 12. Process 1200 receives (1205) multimedia content. Multimedia content in accordance with several embodiments of the invention can be received from a variety of sources including (but not limited to) the camera on a user's device, storage, a network, etc. Process 1200 passes (1210) the received multimedia content through an end-to-end network to generate a set of animation curves. End-to-end networks in accordance with a number of embodiments of the invention can be trained based on rendered training data that can allow for the backpropagation of curve loss through the end-to-end network. Process 1200 stores (1215) the generated animation curves. Animation curves can be stored in a local memory storage, at a remote device, in the cloud, etc. In some embodiments, processes can render video at the user's device based on the stored animation curves. Alternatively, or conjunctively, generated animation curves can be transmitted to another device to be rendered. In some embodiments, transmitting animation curves can allow for efficient, low latency, low bandwidth animation for video chats and/or teleconferencing. In various embodiments, devices can exchange animation curves as a part of a communication, allowing each user to view a rendered animation of the other user. In numerous embodiments, a user can choose a rig (or avatar) that can be used at either their own device and/or at the other user's device.

While specific processes for generating animation curves are described above, any of a variety of processes can be utilized to generate animation curves as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 13:
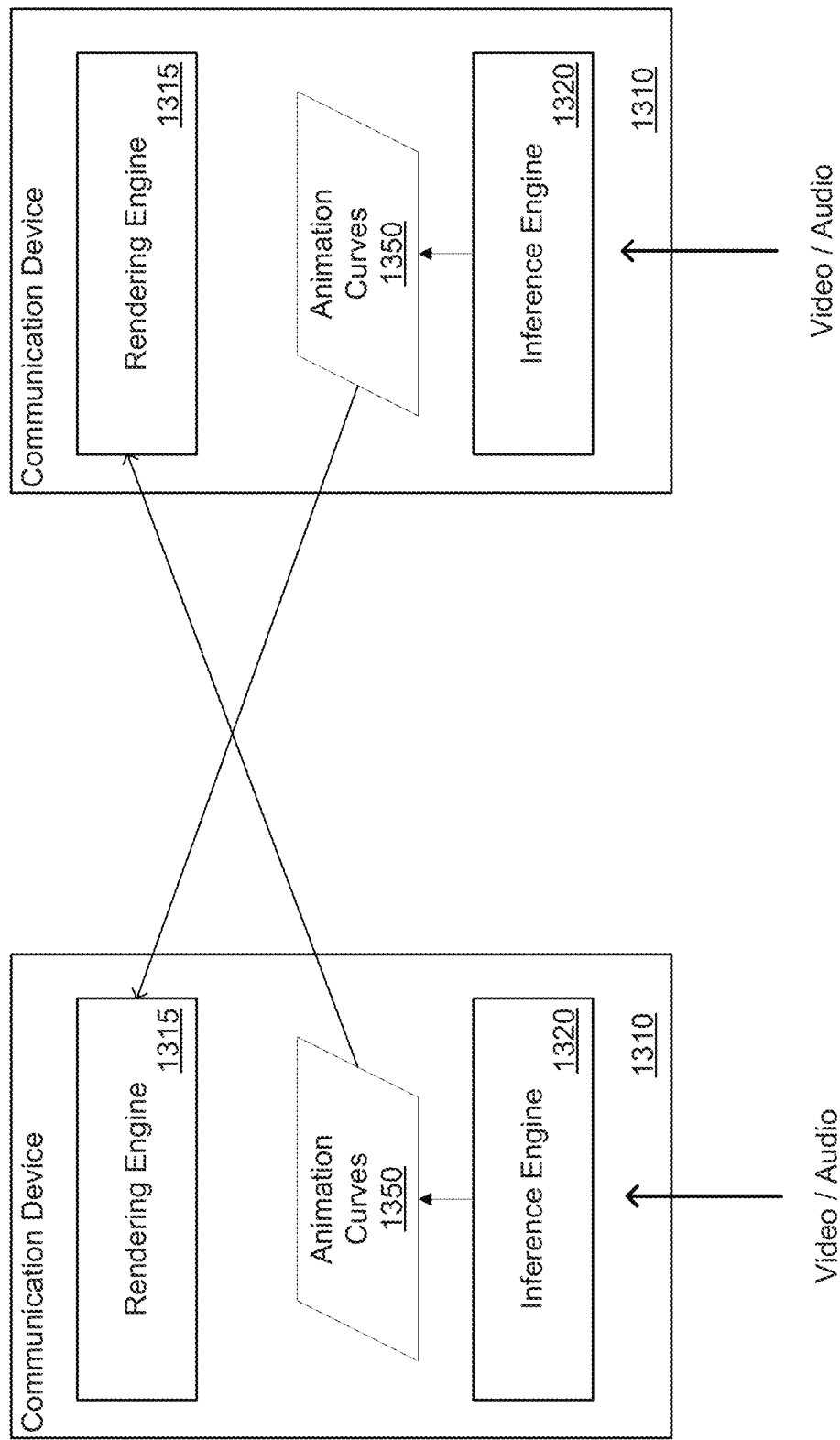
FIG. 13 illustrates an example of a communication system using animation curves in accordance with an embodiment of the invention.

An example of a communication system using animation curves in accordance with an embodiment of the invention is illustrated in FIG. 13. The communication system includes two communication devices 1310. Communication devices in accordance with many embodiments of the invention can communicate using a variety of different network protocols. Although this example is illustrated with a pair of communication devices for simplicity, one skilled in the art will recognize that similar systems can implement any number of communication devices, without departing from this invention.)

In this example, each communication device 1310 includes a rendering engine 1315 and an inference engine 1320. In some embodiments, rendering engines can be used to animate an avatar (or rig) based on animation curves. Rendering engines in accordance with various embodiments of the invention can include (but are not limited to commercial rendering engines (e.g., Unity, Unreal, etc.), neural network renderers, and/or other rendering pipelines. In many embodiments, rendering engines can be used to render training data for training inference engines.

Inference engines (or animation applications) in accordance with many embodiments of the invention can include an end-to-end network, similar to those described herein. In this example, the inference engines generate animation curves 1350 for each communication device (e.g., based on video captured at each device). Animation curves in accordance with a number of embodiments of the invention can be a small number (e.g., ~60 floats) that can be used to animate a rig. This can allow for a very small bandwidth requirements with low latency in conducting a communication session. Animation curves can be used by rendering engines to generate an animated session, such as (but not limited to), rendered video, virtual reality, augmented reality (AR), and/or AR emojis.

While specific implementations of a communication system have been described above with respect to FIG. 13, there are numerous configurations of a communication system, including, but not limited to, those using different numbers of devices, client/server applications, cloud services, and/or any other configuration as appropriate to the requirements of a given application.

Systems for Animation
Animation System

Figure 14:
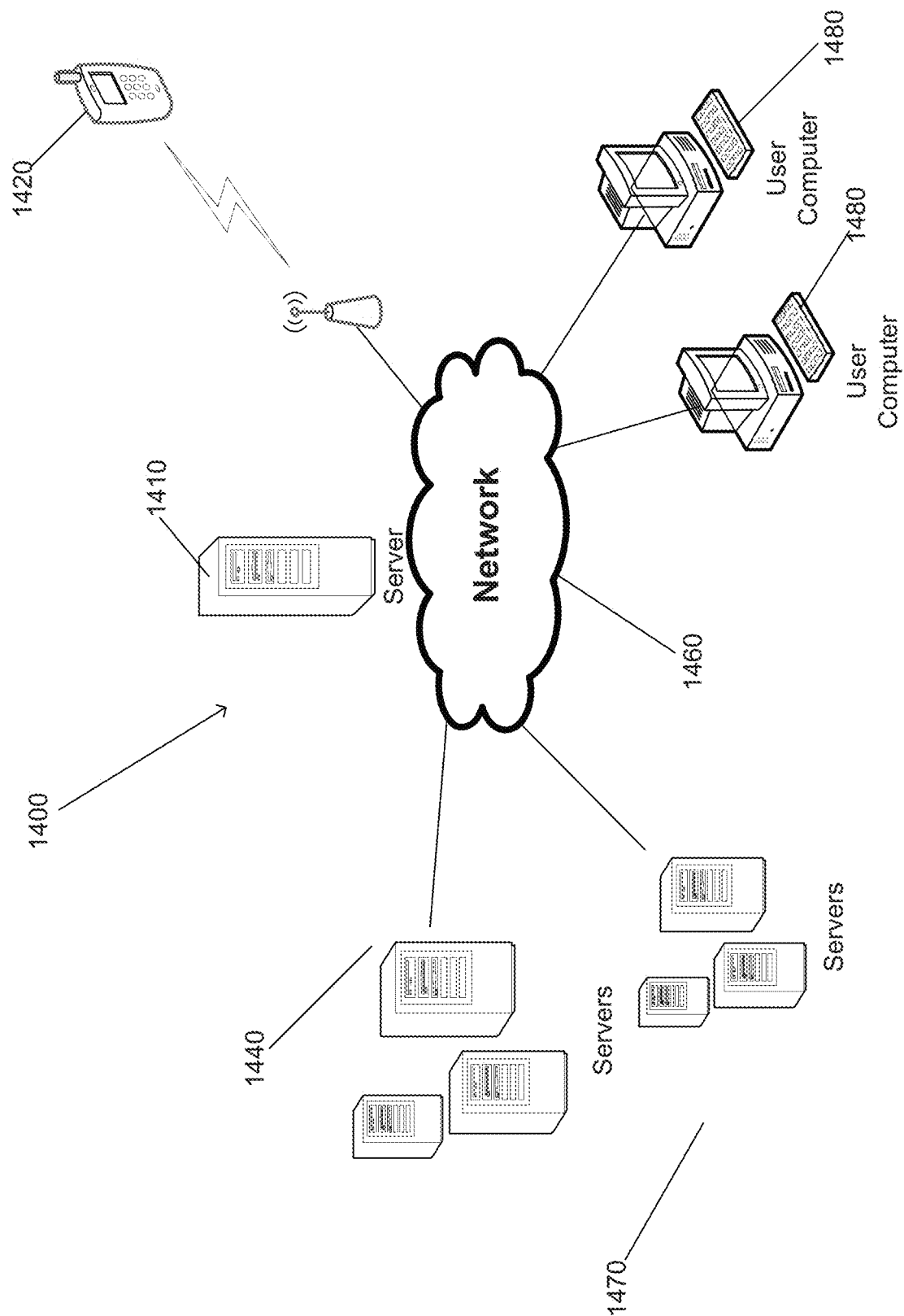
FIG. 14 is an illustration of a system of various devices that may perform one or more processes to generate training data and/or animations in accordance with various embodiments of the invention.

FIG. 14 is an illustration of a system of various devices that may perform one or more processes to generate training data and/or animations in accordance with various embodiments of the invention. An animation system that can generate training data and/or animation curves in accordance with some embodiments of the invention is shown in FIG. 14. Network 1400 includes a communications network 1460. The communications network 1460 is a network such as the Internet that allows devices connected to the network 1460 to communicate with other connected devices. Server systems 1410, 1440, and 1470 are connected to the network 1460. Each of the server systems 1410, 1440, and 1470 is a group of one or more servers communicatively connected to one another via internal networks that execute processes that provide cloud services to users over the network 1460. For purposes of this discussion, cloud services are one or more applications that are executed by one or more server systems to provide data and/or executable applications to devices over a network. The server systems 1410, 1440, and 1470 are shown each having three servers in the internal network. However, the server systems 1410, 1440 and 1470 may include any number of servers and any additional number of server systems may be connected to the network 1460 to provide cloud services. In accordance with various embodiments of this invention, an animation system that uses systems and methods that can generate training data and/or animation curves in accordance with an embodiment of the invention may be provided by a process being executed on a single server system and/or a group of server systems communicating over network 1460. In certain embodiments, processes can be performed on a single CPU, while in other embodiments, processes can be distributed across multiple processors on a single device, such as (but not limited to) graphics processing units (GPUs), neural processing units (NPUs), and/or digital signal processors (DSPs).

Users may use personal devices 1480 and 1420 that connect to the network 1460 to perform processes that can generate training data and/or animation curves in accordance with various embodiments of the invention. In the shown embodiment, the personal devices 1480 are shown as desktop computers that are connected via a conventional "wired" connection to the network 1460. However, the personal device 1480 may be a desktop computer, a laptop computer, a smart television, an entertainment gaming console, or any other device that connects to the network 1460 via a "wired" connection. The mobile device 1420 connects to network 1460 using a wireless connection. A wireless connection is a connection that uses Radio Frequency (RF) signals, Infrared signals, or any other form of wireless signaling to connect to the network 1460. In FIG. 14, the mobile device 1420 is a mobile telephone. However, mobile device 1420 may be a mobile phone, Personal Digital Assistant (PDA), a tablet, a smartphone, or any other type of device that connects to network 1460 via wireless connection without departing from this invention.

As can readily be appreciated the specific computing system used to animate rigs is largely dependent upon the requirements of a given application and should not be considered as limited to any specific computing system(s) implementation.

Training Data Generation Element

Figure 15:
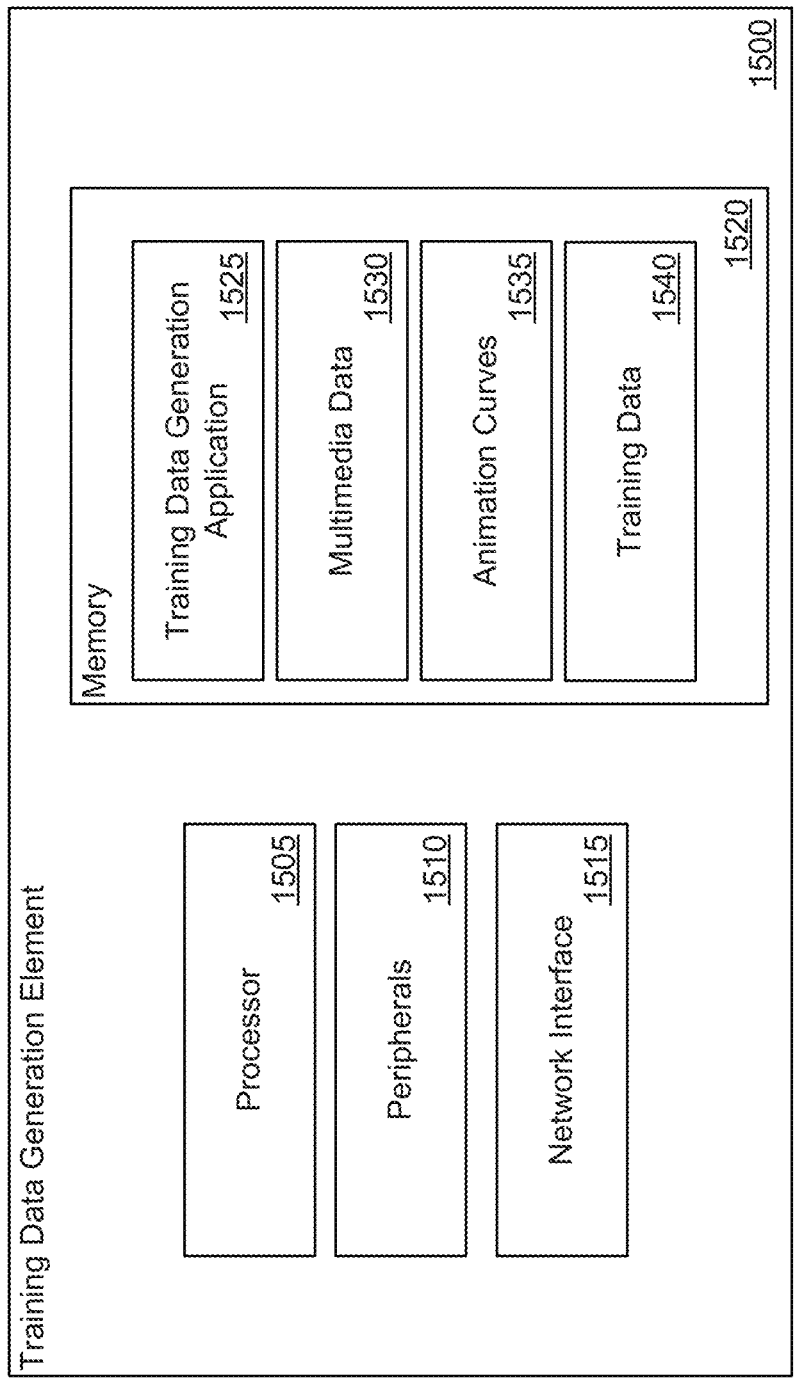
FIG. 15 illustrates an example of a training data generation element that generates training data in accordance with an embodiment of the invention.

FIG. 15 illustrates an example of a training data generation element that generates training data in accordance with an embodiment of the invention. An example of a training data generation element that executes instructions to perform processes that provide interaction with other devices connected to a network and/or for generating training data in accordance with various embodiments of the invention is shown in FIG. 15. Training data generation elements in accordance with many embodiments of the invention can include (but are not limited to) one or more of mobile devices, computers, communication devices, and/or server systems. Training element 1500 includes processor 1505, peripherals 1510, network interface 1515, and memory 1520.

One skilled in the art will recognize that a particular training data generation element may include other components that are omitted for brevity without departing from this invention. The processor 1505 can include (but is not limited to) a processor, microprocessor, controller, or a combination of processors, microprocessor, and/or controllers that performs instructions stored in the memory 1520 to manipulate data stored in the memory. Processor instructions can configure the processor 1505 to perform processes for generating training data in accordance with certain embodiments of the invention.

Peripherals 1510 can include any of a variety of components for capturing data, such as (but not limited to) cameras, microphones, displays, and/or sensors. In a variety of embodiments, peripherals can be used to gather inputs and/or provide outputs. Network interface 1515 allows training data generation element 1500 to transmit and receive data over a network based upon the instructions performed by processor 1505. Peripherals and/or network interfaces in accordance with many embodiments of the invention can be used to gather inputs that can be used to generate training data, including (but not limited to) edge parameters, training data for training a training data generation application, and/or video samples.

Memory 1520 includes a training data generation application 1525, multimedia data 1530, animation curves 1535, and training data 1540. Training data generation applications in accordance with several embodiments of the invention can be used to generate and/or render training data in a variety of different ways, including many processes described herein.

Although a specific example of a training data generation element 1500 is illustrated in FIG. 15, any of a variety of training data generation elements can be utilized to perform processes for generating training data similar to those described herein as appropriate to the requirements of specific applications in accordance with embodiments of the invention.

Animation Element

Figure 16:
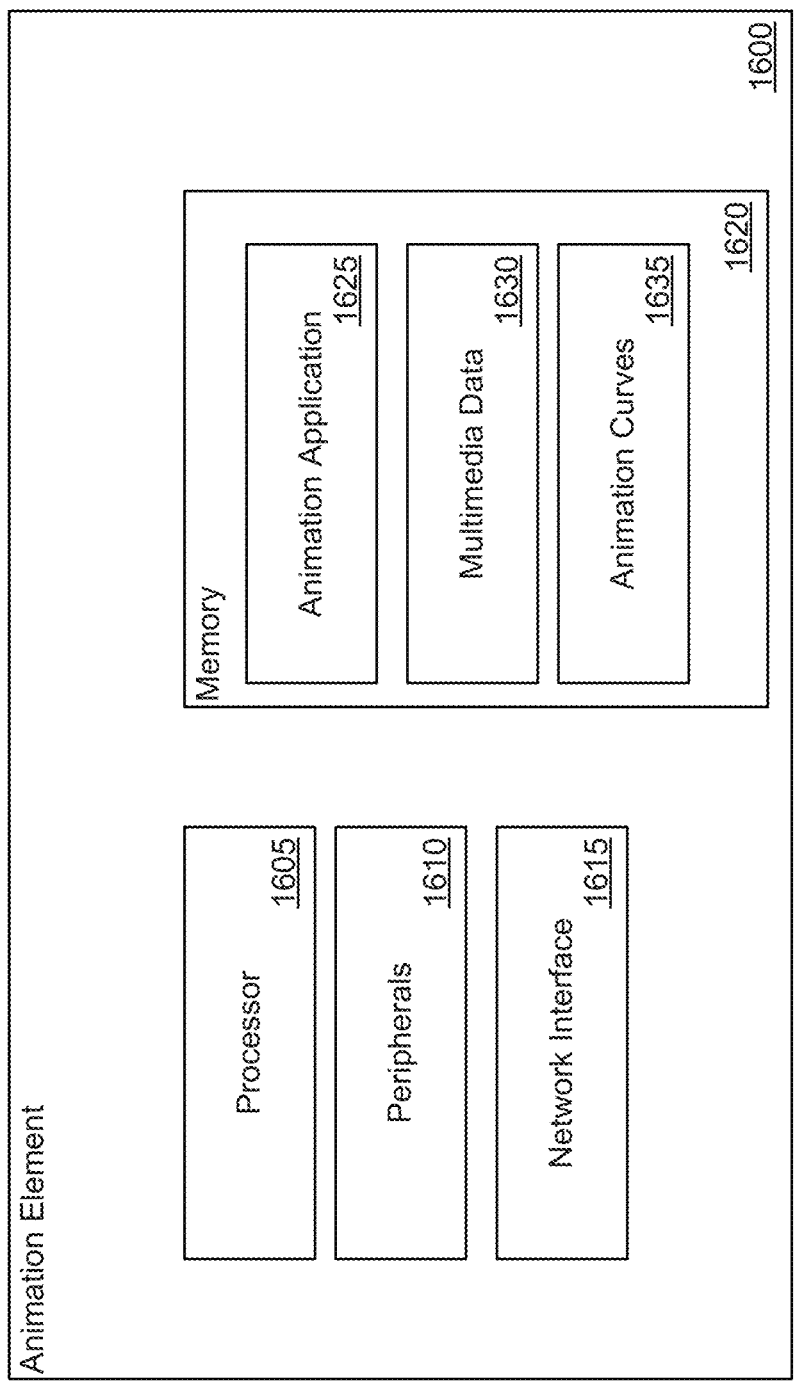
FIG. 16 illustrates an example of a animation element that generates animation curves from multimedia content in accordance with an embodiment of the invention.

FIG. 16 illustrates an example of an animation element that generates animation curves from multimedia content in accordance with an embodiment of the invention. An example of an animation element that executes instructions to perform processes that provide interaction with other devices connected to a network and/or for generating animation curves in accordance with various embodiments of the invention is shown in FIG. 16. Animation elements in accordance with many embodiments of the invention can include (but are not limited to) one or more of mobile devices, motion capture systems, computers, server systems, and/or cloud services. Training element 1600 includes processor 1605, peripherals 1610, network interface 1615, and memory 1620.

One skilled in the art will recognize that a particular animation element may include other components that are omitted for brevity without departing from this invention. The processor 1605 can include (but is not limited to) a processor, microprocessor, controller, or a combination of processors, microprocessor, and/or controllers that performs instructions stored in the memory 1620 to manipulate data stored in the memory. Processor instructions can configure the processor 1605 to generate animation curves based on multimedia content in accordance with certain embodiments of the invention.

Peripherals 1610 can include any of a variety of components for capturing data, such as (but not limited to) cameras, microphones, displays, and/or sensors. In a variety of embodiments, peripherals can be used to gather inputs and/or provide outputs. Network interface 1615 allows animation element 1600 to transmit and receive data over a network based upon the instructions performed by processor 1605. Peripherals and/or network interfaces in accordance with many embodiments of the invention can be used to gather inputs that can be used to generate animation curves based on various characteristics of the input content.

Memory 1620 includes an animation application 1625, model parameters 1630, and training data 1635. Animation applications in accordance with several embodiments of the invention can be used to generate animation curves based on multimedia content. In several embodiments, animation applications can be end-to-end animation applications and/or audio animation applications as described herein. Examples of animation applications are described with reference to FIGS. 11 and 17.

Although a specific example of an animation element 1600 is illustrated in FIG. 16, any of a variety of animation elements can be utilized to perform processes for generating animation curves similar to those described herein as appropriate to the requirements of specific applications in accordance with embodiments of the invention.

Animation Application

In some embodiments, animations can be generated directly from audio. Generating an avatar of high fidelity in real-time is a difficult problem for animation from audio tasks, which will often try to obtain as many interesting signals as possible for the downstream 3D engine to animate. Existing methods for such animations can often have high latency, poor accuracy, and/or are often unable to emote efficiently. Systems and methods in accordance with certain embodiments of the invention can generalize well (e.g., to different subjects, languages, environments, etc.), can operate with low latency, and/or can animate audio events.

In order to match the human perception of speech, audio animation applications in accordance with many embodiments of the invention can generate mouth movements with an unnoticeable latency. In several embodiments, to make the generated avatar more expressive, processes can detect and capture emotions and even nuances of an individual from the speech. Systems and methods in accordance with certain embodiments of the invention can utilize a multi-task approach to analyze streaming input audio and generate multiple semantic signals for the downstream rendering engine to animate with a very low latency (<60 ms). Such tasks in accordance with many embodiments of the invention can include (but are not limited) lip-syncing, voice activity detection (VAD), and audio event recognition (e.g., laughter, greetings, screaming, shouting, etc.).

Figure 17:
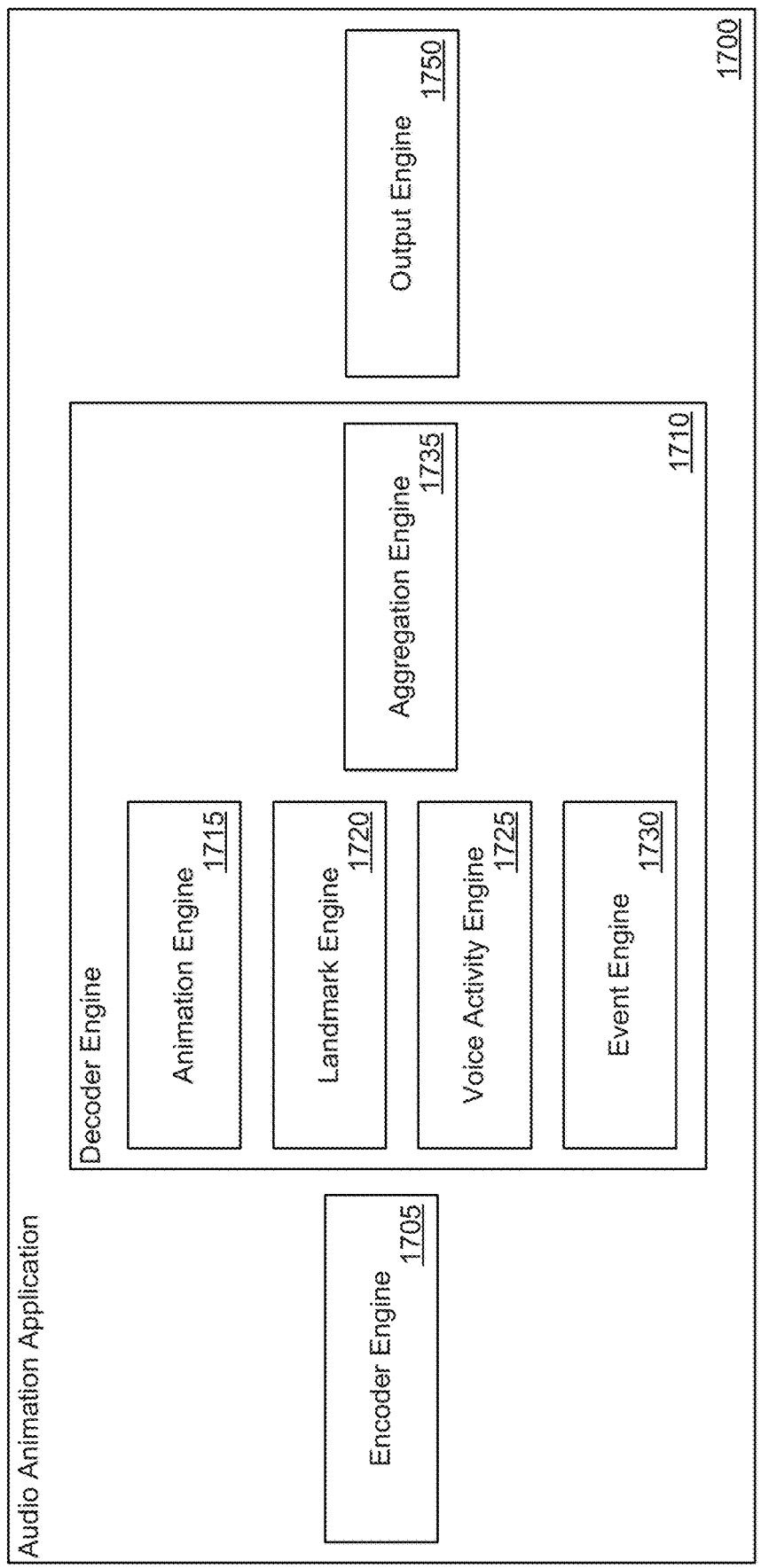
FIG. 17 illustrates an example of an audio animation application in accordance with an embodiment of the invention.

An example of an audio animation application in accordance with an embodiment of the invention is illustrated in FIG. 17. Audio animation applications in accordance with some embodiments of the invention can generate speaking animations based on audio of a speaker. Audio animation application 1700 includes encoder engine 1705, decoder engine 1710, and output engine 1750.

Encoder engines in accordance with numerous embodiments of the invention can process speech to identify features and/or generate embeddings for a set of input audio data. Embeddings in accordance with some embodiments of the invention can include vectors and/matrices. In several embodiments, encoder engines can be include one or more models (e.g., convolutional neural networks, recurrent neural networks, Long Short Term Memory networks (LSTMs), etc.) that can be trained to generate an embedding for input audio data. Input audio data in accordance with several embodiments of the invention can include (but is not limited to) mel-frequency cepstral coefficient (MFCC) features. Encoder engines in accordance with a number of embodiments of the invention can be trained with multi-task learning to generate common embeddings that can be used across multiple tasks. In some embodiments, encoder engines can include one or more pre-trained models that can be tuned to generate an embedding that can be used for multiple tasks.

Unlike existing models, encoder engines in accordance with certain embodiments of the invention can include models that are smaller and with lower latency. In a number of embodiments, encoder engines can limit the number of intermediate neurons in one or more of the models to less than 1000 or less than 500 (e.g., 384).

In existing models, MFCC extraction can use large windows and stride sizes (e.g., 32/20, in milliseconds), with 19 MFCC windows. In some embodiments, input buffers for the models can be limited (e.g., to 16/16) to reduce the latency of the models. Models in accordance with a number of embodiments of the invention can limit the number of overlapping MFCC windows to 5, which can lead to latency drops from 200 ms to 40 ms. Models in accordance with certain embodiments of the invention can be about 7 MB (as opposed to other models exceeding 200 MB) with an overall latency of ~40 ms (as opposed to 200 ms) while still providing synthesized animations of similar visual quality.

In many embodiments, encoder engines can use separate control threads for sampling and buffering audio in real time in order to feed the inference pipeline. Sampling threads in accordance with certain embodiments of the invention can push audio packets as fast as possible (e.g., 62.5 FPS for packets of 16 ms) to avoid missing samples, which would greatly attenuate the inference quality. Buffering threads can consume all the audio frames by a track function that calls 'recorder->read( )' and passes all the stacked audio frames to the rest pipeline, then empties the recording queue.

In certain embodiments, decoder engines can be multi-branch decoders to generate multiple outputs based on an embedding from an encoder engine. Multi-branch decoders in accordance with some embodiments of the invention can perform multiple tasks, such as (but not limited to) animation curves (lip-syncing), 2d landmarks, voice activity detection (VAD), and/or audio event recognition. Decoder engines in accordance with a variety of embodiments of the invention can include one or more decoders for different tasks. In various embodiments, each decoder can be a 2-layer of LSTM network with 64 hidden units. Multiple decoders for different tasks can allow networks for the different decoders to model task relevant information along the time dimension. In several embodiments, each decoder generates an output via a fully connected layer. Decoders in accordance with many embodiments of the invention can generate outputs of different dimensions according to each task.

In this example decoder engine 1710 includes animation engine 1715, landmark engine 1720, voice activity engine 1725, event engine 1730, and aggregation engine 1735. In some embodiments, decoder engines can include multiple task engines that can generate predictions for different tasks based on embeddings from an encoding engine.

Animation engines in accordance with certain embodiments of the invention can generate animation curves based on input audio (e.g., to synch lips, jaws, mouths, and/or tongues of models to correspond to spoken audio). In certain embodiments, animation engines can output speech-related blendshape weights. Animation engines in accordance with a variety of embodiments of the invention can output weights for lips, jaws, and/or tongues, which can be used to animate a 3D model.

In certain embodiments, landmark engines can predict 2D landmarks for a model based on input audio data. Since the 2d landmarks are tightly coupled with blendshapes, landmark engines in accordance with numerous embodiments of the invention can be used to provide additional supervision to other identified landmarks (e.g., from video).

Voice activity engines in accordance with various embodiments of the invention can determine whether the input audio is speech or not, which can help to determine when an avatar should be animated, making it more robust to noisy environments and preventing an avatar to making mouth motions in response to background noises.

In a variety of embodiments, event engines can generate semantic signals that indicate the occurrence of audio events, including (but not limited to) laughter, screaming, crying, greetings, etc. Event engines in accordance with various embodiments of the invention can generate more convincing visual effects based on semantic signals. In some embodiments, semantic signals can allow for the generation of animations that can play a key role in building a social connection with users in VR/AR applications.

Decoder engines in accordance with a variety of embodiments of the invention can influence the outputs of other decoder engines. For example, voice activity engines in accordance with a variety of embodiments of the invention can determine a state (e.g., "talking" or "listening"), which can be fed as an input to a landmark engine and/or animation engine to influence the predicted blendshape weights for the face, to animate head movements, etc.

Aggregation engines in accordance with several embodiments of the invention can aggregate the predictions of multiple branches of a decoder engine to generate a final prediction to be used to generate output animation curves. In numerous embodiments, outputs for a current frame can averaged with the top-k predictions. In certain embodiments, aggregation engines can push the output of a model into a circular queue to coordinate sampling and buffering threads and to avoid reading slowdown. In certain embodiments, aggregation engines can balance different predictions (e.g., using lip synch weights when voice activity is detected and no other events are detected (e.g., when activity prediction scores are above a given threshold).

Output engines in accordance with a variety of embodiments of the invention can generate various outputs based on the final predictions of decoder engines. Outputs in accordance with numerous embodiments of the invention can include (but are not limited to) animation curves, blendshape weights, rendered frames of video, labeled training data, corresponding audio, etc.

Although a specific example of an audio animation application is illustrated in this figure, any of a variety of audio animation applications can be utilized to perform processes for generating animations from audio similar to those described herein as appropriate to the requirements of specific applications in accordance with embodiments of the invention.

Figure 18:
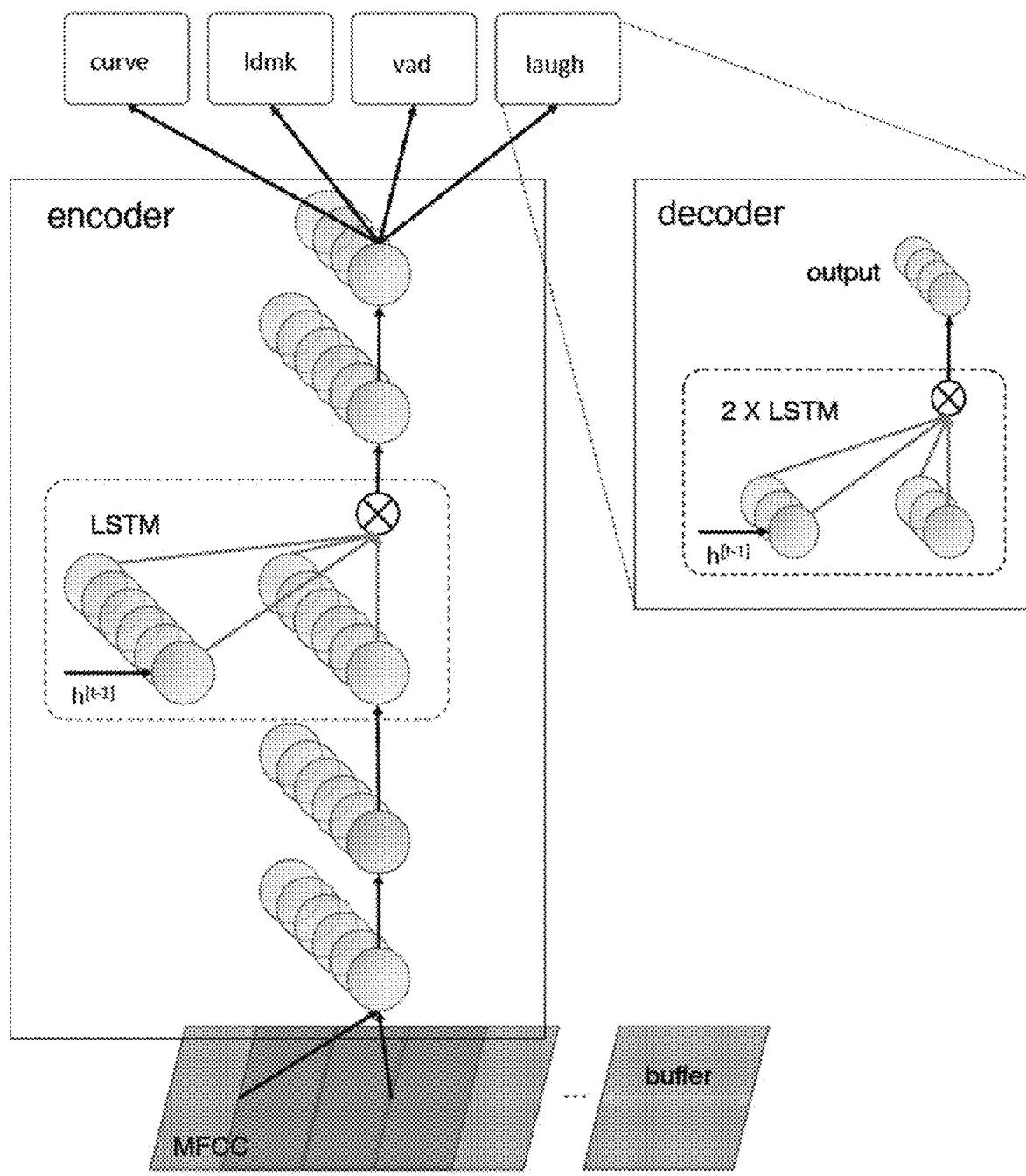
FIG. 18 illustrates an example of an encoder-decoder network for animation from audio in accordance with an embodiment of the invention.

In numerous embodiments, audio animation applications can utilize an encoder-decoder architecture as a multi-task model. An example of an encoder-decoder network for animation from audio in accordance with an embodiment of the invention is illustrated in FIG. 18. In this example, MFCC are extracted from input audio. A window of features is fed into the encoder, which are shared by downstream tasks (e.g., curve, ldmk, vad, laugh). The encoder produces an embedding d, which is passed through a unique decoder for each task to transform the embedding to the required output.

In many embodiments, encoder-decoder architectures for audio animation applications can be trained to optimize training objectives to perform multiple tasks. In certain embodiments, encoders can be trained by backpropagating losses from each of the task decoders. Alternatively, or conjunctively, encoders in accordance with some embodiments of the invention can be trained by computing and backpropagating an aggregate loss for the task decoders.

In numerous embodiments, encoders can be pre-trained networks, trained to perform similar, but different, tasks such as (but not limited to) speech-to-text (STT). For example, models trained for STT can learn to map raw audio signals into a semantic space that intersects with high level perceptions. As there can be a domain gap between the pre-trained task and the tasks of multi-task decoder, processes in accordance with certain embodiments of the invention can first optimize only the new layers (e.g., the task decoders and the aggregation layers), freezing the weights of the encoder. This can help the model to quickly reach a convergence while maintaining a stable embedding that was learned from the related task (e.g., STT). After one or more epochs, the layers of the encoder can be unfrozen, allowing all of the layers to update to reach to the optimal state.

In various embodiments, training data can be preprocessed and/or cleaned. Preprocessing in accordance with a variety of embodiments of the invention can include splitting the data into short clips (e.g., 8 seconds), filtering out clips with an out-of-the-plane rotation greater that exceeds a threshold, etc.

Training data for training audio animation networks in accordance with several embodiments of the invention can include labeled data that can include audio, video, and/or labels for one or more of the different tasks. In numerous embodiments, training data can be generated as described throughout this description. In certain embodiments, training data can be generated from video using a tracker and a mapper to generate ground-truth labels for each task. Trackers in accordance with several embodiments of the invention can generate facial landmarks from videos. In several embodiments, mappers can solve mappings from 2d to 3d.

Processes in accordance with various embodiments of the invention can gather speech-related blendshapes (e.g., mouth and jaw) from the video as training labels for associated audio. In many embodiments, a training objective function can be defined as, $$L = L_p + L_v$$

where, $L_p$ is the position term, $L_p = |y_t - \hat{y}_t|_p$ and $L_v = |v_t - \hat{v}_t|_p$ is the velocity term that matches the speech of each shape. Velocity $v_t$ of $y_t$ can be defined as, $$v_t = y_t - y_{t-1}$$

For animating tongues, processes in accordance with various embodiments of the invention can use multimedia data labeled with tongue movements. One key technical challenge for tongue animation is to generate the large quantity of accurate ground truth needed for training a deep learning network. Tongue movements are very hard to see in video (usually occluded). Processes in accordance with some embodiments of the invention can combine a small amount of hand-crafted tongue animations from an animator with a large corpus of training video to produce a large set of tongue training data. Synchronized with input audio, Audio to Animation ground truth data in accordance with numerous embodiments of the invention can form the base animation layer for adding tongue animation to. In some embodiments, tongue controls can be keyed (e.g., using audio cues from the input audio) and tongue movements can be matched to the underlying mouth shapes and articulations. Tongue animations can be verified and adjusted based on the overall result played back at 100 fps. Note that, ensuring the tongue movement looks plausible at a high frame rate over 60 fps can ensure that the tongue position looks physically correct when regressed using high-frequency audio signal.

In certain embodiments, special considerations can be made to skip any faulty non-zero animation values for tongue controls in training data, when the mouth controls that close the lips are active. This ensures that the model learns to keep tongue controls at zero when the mouth is closed. In certain embodiments, during inference, tongue controls can be convolved with an impulse response filter to remove noise and outliers, and to match the physically correct movement of the tongue when speaking. In addition, since tongue movements can be highly related to lips and can be difficult to accurately label, processes in accordance with certain embodiments of the invention can use far less data for tongue movements than for the mouth and jaw without affecting the overall performance.

In several embodiments, processes can train decoders for voice activity detection using training data that can include samples with various characteristics (or labels), such as (but is not limited to) no speech, clean speech, speech with music, speech with noise, no speech with noise, etc. Models for voice activity detection in accordance with various embodiments of the invention can be trained as a binary classification task (e.g., speech vs no speech).

Training audio event recognition in accordance with many embodiments of the invention can utilize a dataset with labeled samples including laughter (and/or other audio events) as well as labeled samples with no audio events (e.g., silence, speech, noise, etc.). In a number of embodiments, training for audio event recognition can be performed using a hard negative example mining strategy.

To further improve the generalization across different scenarios, processes in accordance with certain embodiments of the invention can add a strong scene simulation for the data augmentation. Data augmentation in accordance with certain embodiments of the invention can include (but is not limited to) multi-source noise injection, room simulation, speed/volume permutation, etc. Injected noise can include various different background noises, such as (but not limited to) street, coffee shop, crowded hall, raining, the noise of air conditioners and/or office noise. In various embodiments, in order to better simulate the real-world scenarios, processes can randomize characteristics of the generated samples, such as (but not limited to) locations in a virtual room for microphones, locations for source and/or noise audio, virtual room types, and/or noise types. Processes in accordance with some embodiments of the invention can then simulate the audio according to the various characteristics to generate samples.

Figure 19:
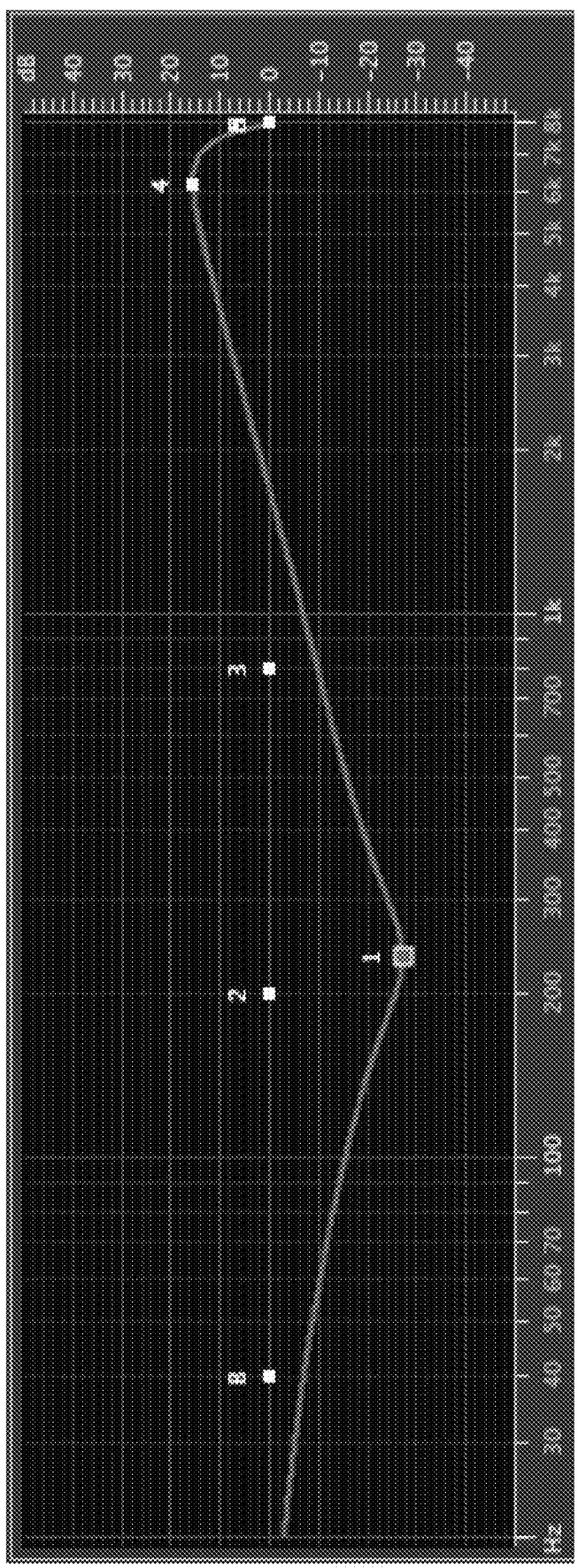
FIG. 19 illustrates an example of parametric equalization that simulates a microphone.
Figure 20:
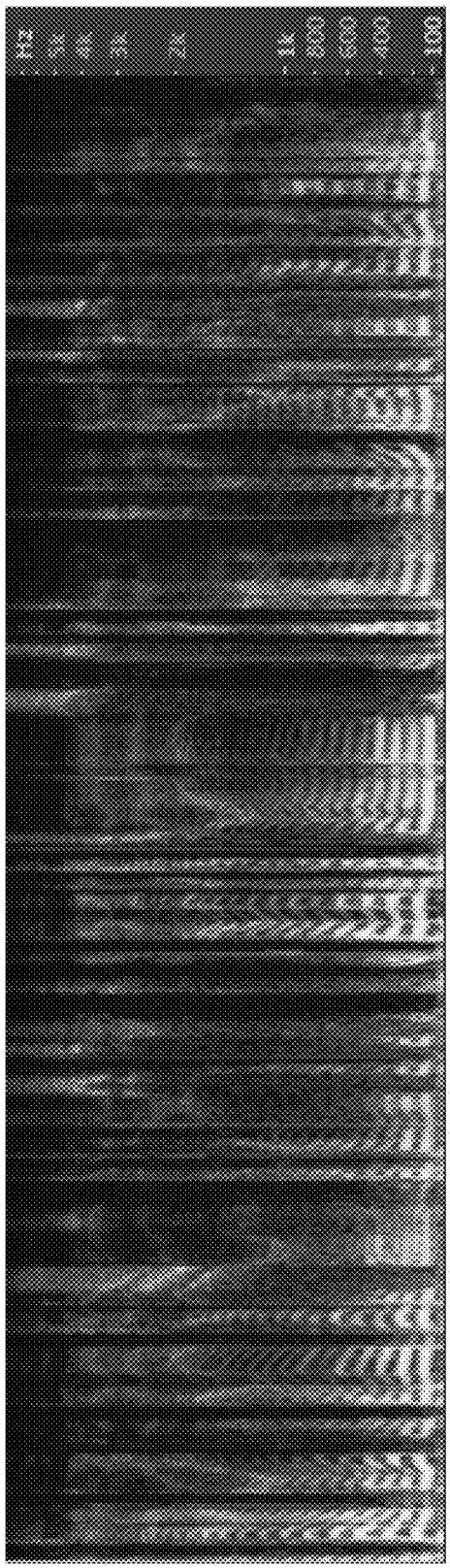
FIG. 20 illustrates an example of augmenting samples to simulate microphones in accordance with an embodiment of the invention.
Figure 20:
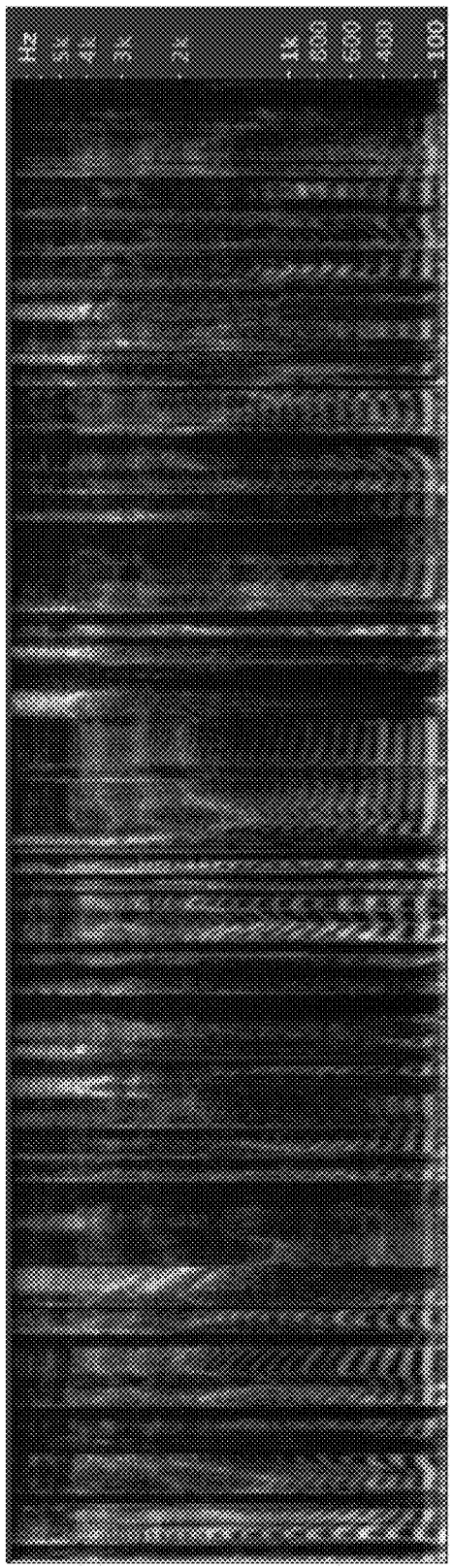

As microphones are manufactured for different purposes and have different capture performances across the spectrum, data augmentation in accordance with certain embodiments of the invention can use parametric equalization. In many embodiments, the parameters of such equalization can be chosen randomly at training time. An example of parametric equalization that simulates a microphone is illustrated in FIG. 19. In some embodiments, frequency power can be augmented or attenuated, which can have a great effect on the MFCC features. An example of augmenting samples to simulate microphones in accordance with an embodiment of the invention is illustrated in FIG. 20. In this example, the first spectrum 2005 illustrates a spectrum of a raw sample without augmentation. The second spectrum 2010 illustrates an equalized sample augmented with randomized parametric equalization parameters.

In some embodiments, training for animation networks can include a process for mouth sealing. It's very common that people tend to keep their mouths a little bit open when they are not speaking, which can further cause the imbalance of closed mouths in animations. Since neural networks can be prone to learn this bias, the resulting talking mouth can often look like a person is mumbling—moving within a very small range. Processes in accordance with various embodiments of the invention can perform mouth sealing to "seal" non-speaking mouths. In many embodiments, processes can measure a loudness of a wave signal and replace frames in which the loudness is less than a threshold τ, with a frame where the mouth is closed. This can allow a model to achieve a better visual effect. In various embodiments, processes can determine voice activity during the animation process, and generate blendshape weights that close the mouth when the voice activity does not exceed a threshold.

Process for Animation from Audio

Figure 21:
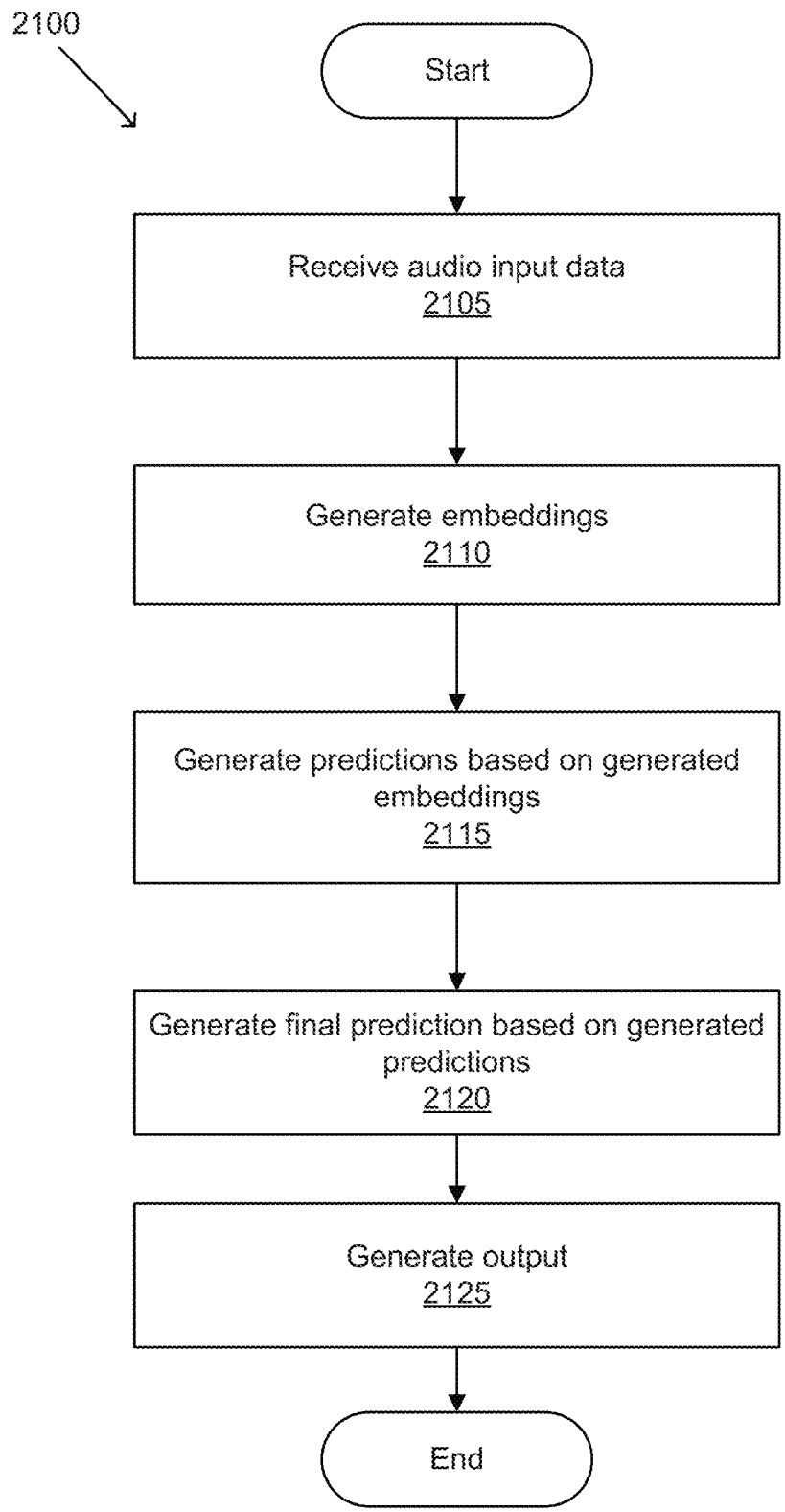
FIG. 21 conceptually illustrates an example of a process for generating animation from audio.

An example of a process for generating animation from audio is conceptually illustrated in FIG. 21. In many embodiments, animation data can be generated from audio for various applications, such as (but not limited to) video conferencing, 3D animation rendering, etc. Process 2100 receives (2105) audio input data. Audio input data in accordance with certain embodiments of the invention can include (but is not limited to) raw audio data, mel-frequency cepstral coefficients (MFCC), etc.

Process 2100 generates (2110) embeddings from the audio input data. In a number of embodiments, embeddings can be generated to identify features from the audio input data. Generating embeddings in accordance with numerous embodiments of the invention can be performed using models (e.g., recurrent neural networks, LSTMs, CNNs, etc.) that can be trained to identify features from audio input data based on various different tasks.

Process 2100 generates (2115) predictions based on the generated embeddings. In a number of embodiments, predictions can be generated by multiple decoders that can generate predictions for different tasks. Tasks in accordance with a variety of embodiments of the invention can include (but are not limited to) animation curves (lip-syncing), 2d landmarks, voice activity detection (VAD), and/or audio event recognition. In some embodiments, predictions can include (but are not limited to) blendshape weights, event detection, voice activity levels, landmarks, and/or animation curves.

Processes in accordance with a number of embodiments of the invention can generate predictions for tasks based on the generated predictions of other tasks. For example, processes in accordance with certain embodiments of the invention can predict blend shapes and/or animation curves based on predicted voice activity levels or states (e.g., "talking" or "listening").

Process 2100 generates (2120) a final prediction based on the generated predictions. Final predictions in accordance with numerous embodiments of the invention can be based on weights from one or more decoders, as well as prediction scores (e.g., for voice activity detection, event detection, etc.). For example, processes in accordance with a variety of embodiments of the invention can use lip synch weights when voice activity is detected and no other events are detected, while using a different set of weights when activity prediction scores are above a given threshold.

Process 2100 generates (2125) output based on the generated predictions. Outputs in accordance with numerous embodiments of the invention can include (but are not limited to) animation curves, blendshape weights, rendered frames of video, labeled training data, corresponding audio, etc.

While specific processes for generating animations from audio are described above, any of a variety of processes can be utilized to generate animations form audio as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Although specific methods of animation are discussed above, many different methods of animation can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for generating animation from audio, the method comprising:
   receiving input audio data;
   generating an embedding for the input audio data, wherein the embedding identifies features from the input audio data;
   generating, utilizing a first network within a multi-branch decoder, a set of blendshape weight predictions from the generated embedding for the input audio data, wherein the set of blendshape weight predictions comprises blendshape weights;
   generating, utilizing a second network within the multi-branch decoder, a set of event predictions from the generated embedding for the input audio data, wherein the set of event predictions comprises at least one of event detection and voice activity detection;

generating a final prediction from the set of blendshape weight predictions and the set of event predictions, wherein the final prediction comprises a set of final blendshape weights; and generating an output based on the generated final prediction.

2. The method of claim 1, wherein the input audio data comprises mel-frequency cepstral coefficient (MFCC) features.

3. The method of claim 2, wherein generating the embedding comprises utilizing at least one of a recurrent neural network and a convolutional neural network to generate the embedding based on the MFCC features.

4. The method of claim 1, wherein the first network comprises a first Long Short Term Memory network (LSTM) and the second network comprises a second LSTM.

5. The method of claim 1, wherein generating the set of event predictions comprises determining a level of voice activity in the input audio data.

6. The method of claim 1, wherein generating the set of event predictions comprises determining whether an audio event has occurred, wherein the audio event comprises at least one of laughing, crying, screaming, and/or shouting.

7. The method of claim 6, wherein generating the final prediction comprises:

determining whether a laughter event has occurred; and generating blendshape weights to cause an avatar to perform a laughing motion.

8. The method of claim 1, wherein generating the final prediction comprises:

determining whether a level of voice activity exceeds a threshold; and when the level of voice activity does not exceed a threshold, generating blendshape weights that close the mouth.

9. The method of claim 1, wherein generating the output comprises rendering an avatar model based on the final blendshape weights of the final prediction.

10. The method of claim 1, wherein the final prediction further comprises animation curves for animating an avatar model.

11. A non-transitory machine readable medium containing processor instructions for generating animation from audio, where execution of the instructions by a processor causes the processor to perform a process that comprises:

receiving input audio data;

generating an embedding for the input audio data, wherein the embedding identifies features from the input audio data;

generating, utilizing a first network within a multi-branch decoder, a set of blendshape weight predictions from the generated embedding for the input audio data, wherein the set of blendshape weight predictions comprises blendshape weights;

generating, utilizing a second network within the multi-branch decoder, a set of event predictions from the generated embedding for the input audio data, wherein the set of event predictions comprises at least one of event detection and voice activity detection;

generating a final prediction from the set of blendshape weight predictions and the set of event predictions, wherein the final prediction comprises a set of final blendshape weights; and generating an output based on the generated final prediction.

12. The non-transitory machine readable medium of claim 11, wherein the input audio data comprises mel-frequency cepstral coefficient (MFCC) features.

13. The non-transitory machine readable medium of claim 12, wherein generating the embedding comprises utilizing at least one of a recurrent neural network and a convolutional neural network to generate the embedding based on the MFCC features.

14. The non-transitory machine readable medium of claim 11, wherein the first network comprises a first Long Short Term Memory network (LSTM) and the second network comprises a second LSTM.

15. The non-transitory machine readable medium of claim 11, wherein generating the set of event predictions comprises determining a level of voice activity in the input audio data.

16. The non-transitory machine readable medium of claim 11, wherein generating the set of event predictions comprises determining whether an audio event has occurred, wherein the audio event comprises at least one of laughing, crying, screaming, and/or shouting.

17. The non-transitory machine readable medium of claim 16, wherein generating the final prediction comprises:

determining whether a laughter event has occurred; and generating blendshape weights to cause an avatar to perform a laughing motion.

18. The non-transitory machine readable medium of claim 11, wherein generating the final prediction comprises:

determining whether a level of voice activity exceeds a threshold; and when the level of voice activity does not exceed a threshold, generating blendshape weights that close the mouth.

19. The non-transitory machine readable medium of claim 11, wherein generating the output comprises rendering an avatar model based on the final blendshape weights of the final prediction.

20. The non-transitory machine readable medium of claim 11, wherein generating the set of event predictions comprises:

generating a first prediction for a first task; and generating a second prediction for a second task based on the generated first prediction for the first task.

* * * * *